US 6,538,841 B2

(12) United States Patent
Porter et al.

(10) Patent No.: US 6,538,841 B2
(45) Date of Patent: Mar. 25, 2003

(54) CARTRIDGE STOP/COMPRESSION PAD FOR A TAPE CARTRIDGE PICKER

(75) Inventors: Ryan Stuart Porter, Monument, CO (US); Paddy Eliot Collins, Colorado Springs, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/891,870

(22) Filed: Jun. 22, 2001

(65) Prior Publication Data

US 2002/0057519 A1 May 16, 2002

Related U.S. Application Data

(63) Continuation of application No. 09/860,773, filed on May 17, 2001, which is a continuation-in-part of application No. 09/710,645, filed on Nov. 10, 2000.

(51) Int. Cl.[7] .............................................. G11B 15/68
(52) U.S. Cl. ........................................................ 360/92
(58) Field of Search ................................ 360/92, 98.04, 360/98.05, 98.06; 369/30.45, 30.48, 30.7, 30.72, 30.75; 242/335, 337, 337.1, 338, 338.4; 414/273, 277, 282, 283

(56) References Cited

U.S. PATENT DOCUMENTS

| 4,063,294 A | | 12/1977 | Burkhart | 360/92 |
|---|---|---|---|---|
| 4,878,137 A | * | 10/1989 | Yamashita et al. | 360/98.05 |
| 5,449,091 A | | 9/1995 | Dalziel | 221/81 |
| 5,515,213 A | | 5/1996 | Elliott | 360/92 |
| 5,659,444 A | * | 8/1997 | Dang et al. | 360/98.04 |
| 5,682,276 A | | 10/1997 | Hinnen et al. | 360/92 |
| 5,746,385 A | | 5/1998 | Leger | 242/337 |
| 5,752,668 A | | 5/1998 | Patterson | 242/337 |
| 5,760,995 A | | 6/1998 | Heller et al. | 360/92 |
| 5,781,517 A | * | 7/1998 | Nakajima | 369/30.43 |
| 5,847,897 A | | 12/1998 | Marlowe | 360/92 |
| 5,856,894 A | | 1/1999 | Marlowe | 360/92 |
| 5,959,803 A | | 9/1999 | Okamoto et al. | 360/92 |
| 5,975,450 A | | 11/1999 | Leger | 242/337 |
| 6,088,189 A | * | 7/2000 | Utsumi et al. | 360/92 |
| 6,097,566 A | | 8/2000 | Heller et al. | 360/92 |
| 6,130,800 A | | 10/2000 | Ostwald | 360/92 |
| 6,144,520 A | * | 11/2000 | Yamakawa et al. | 360/92 |

FOREIGN PATENT DOCUMENTS

EP   WO 89/08311   1/1989

OTHER PUBLICATIONS

Material from Worldwide Web @www.m4data–usa.com/products/magfile_1.html, May 17, 2001.

* cited by examiner

Primary Examiner—David L. Ometz
(74) Attorney, Agent, or Firm—Morrison & Foerster LLP

(57) ABSTRACT

The cartridge stop/compression pad includes a beveled portion and a planar portion that permits the cartridge stop/compression pad to serve a dual function of compression pad and cartridge stop. During retrieval of tape cartridges from a single cartridge interface, the planar portion of the compression pad is oriented such that a tape cartridge is stopped during manual insertion from the single cartridge interface in position for selection and retrieval by the cartridge picker. During retrieval of tape cartridges from all other locations, tape cartridges contact the beveled portion of the cartridge stop/compression pad causing the cartridge stop/compression pad to function as a compression pad and expand vertically upward to permit the cartridge to be fully received into the cavity of the cartridge picker.

23 Claims, 23 Drawing Sheets

CARTRIDGE STOP/COMPRESSION PAD FOR A TAPE CARTRIDGE PICKER

CROSS REFERENCE TO RELATED APPLICATIONS

This application is a continuation of U.S. patent application Ser. No: 09/860,773 filed on May 17, 2001, titled "Tape Cartridge Picker For An Automated Tape Cartridge Autoloader/Library System," which is a continuation in part of U.S. patent application Ser. No. 09/710,645 filed on Nov. 10, 2000, titled "Automated Tape Cartridge Autoloader/Library System," and which is incorporated herein by reference in its entirety.

FIELD OF THE INVENTION

The invention is related to the field of data storage, and in particular, to a tape cartridge stop/compression pad for a tape cartridge picker.

PROBLEM

A popular device for handling large amounts of information in a data processing system is an automated tape cartridge library. Tape cartridge libraries store and manage multiple tape cartridges containing magnetic tape media on which data is stored. Tape cartridge libraries include a plurality of fixed tape cartridge storage locations, at least one read/write tape drive, and a tape cartridge retrieval/transport mechanism, known in the art as a "cartridge picker." The tape cartridge storage locations are arranged in predetermined arrays of uniquely identified cells with each cell containing a single tape cartridge. Each of the individual tape cartridges includes a computer readable identifying indicia, such as a bar code used to identify the tape cartridge for retrieval by the cartridge picker.

Cartridge pickers automatically exchange individual tape cartridges between their storage locations and the tape drive(s). Different types of cartridge pickers are used to accommodate the various tape cartridge arrangements in different tape cartridge libraries. One example of a cartridge picker utilizes a rotatable robotic arm with an optical sensor for selecting and retrieving the correct tape cartridge and transporting the tape cartridge to the tape drive(s). Another example of a cartridge picker utilizes a linear robotic mechanism that moves along an X-Y translation or about a pivot in a rotary motion to select, retrieve, and transport tape cartridges to the tape drive(s). The tape drive(s) is operable to read/write data from or to the magnetic tape in the tape cartridge. A host computer communicates with a library control unit and the tape drive(s) to control the operation of the tape cartridge library.

Unfortunately, tape cartridge pickers are complex mechanisms that must translate among the multiple fixed tape cartridge storage locations, moving in two or three dimensions to retrieve desired tape cartridges for delivery to the tape drive(s). Thus, the tape cartridge picker is a considerable factor in the overall size of a tape cartridge library. For example, in a typical retrieval process from a storage location, the tape cartridge picker must move, usually along an X-axis, to a tape cartridge storage location, orient with the storage location, retrieve a tape cartridge from the location, move again along the X-axis to the tape drive location, orient with the tape drive, and load the tape cartridge.

Additionally, the complexity of tape cartridge pickers accounts for a significant component of the cost of tape cartridge libraries and require a significant amount of space to implement. In many applications, the cost of a tape cartridge library cannot be justified unless there are a large number of tape cartridges that are stored and managed by the tape cartridge library.

SOLUTION

The present invention solves the problems outlined above and advances the art by providing a tape cartridge stop/compression pad for a rotating tape cartridge picker. The cartridge picker is configured for use with a tape cartridge library, termed "autoloader/library system" herein. The tape cartridge picker includes a turntable that rotates in a fixed base to interface with at least one tape cartridge storage location and at least one tape drive. The turntable includes a cavity configured to receive an individual tape cartridge. The cavity is defined in the turntable about a central axis of rotation so that once received in the cavity, the tape cartridge may be rotated within the turntable for delivery to at least one storage location or at least one tape drive. Advantageously, the cartridge picker does not translate in two or three dimensions as in the prior art, but instead merely rotates within the base to position the tape cartridge picker to exchange tape cartridges with at least one storage location and at least one tape drive.

The tape cartridges are loaded onto the turntable using a translation arm that extends horizontally from the turntable to engage or hook a tape cartridge and pull the tape cartridge into the cavity. The tape cartridges are unloaded from the turntable by extending the translation arm to slide the tape cartridge out of the cavity and into the at least one storage location or the at least one tape drive.

The cartridge stop/compression pad includes a beveled portion and a planar portion that permits the cartridge stop/compression pad to serve a dual function of compression pad and cartridge stop. During retrieval of tape cartridges from a single cartridge interface, the planar portion of the compression pad is oriented such that tape cartridges are stopped during insertion from the single cartridge interface in position for selection and retrieval by the cartridge picker. During retrieval of tape cartridges from all other locations, tape cartridges contact the beveled portion of the cartridge stop/compression pad causing the cartridge stop/compression pad to function as a compression pad and expand vertically upward to permit the cartridge to be fully received into the cavity of the cartridge picker.

DETAILED DESCRIPTION

Figure 1:
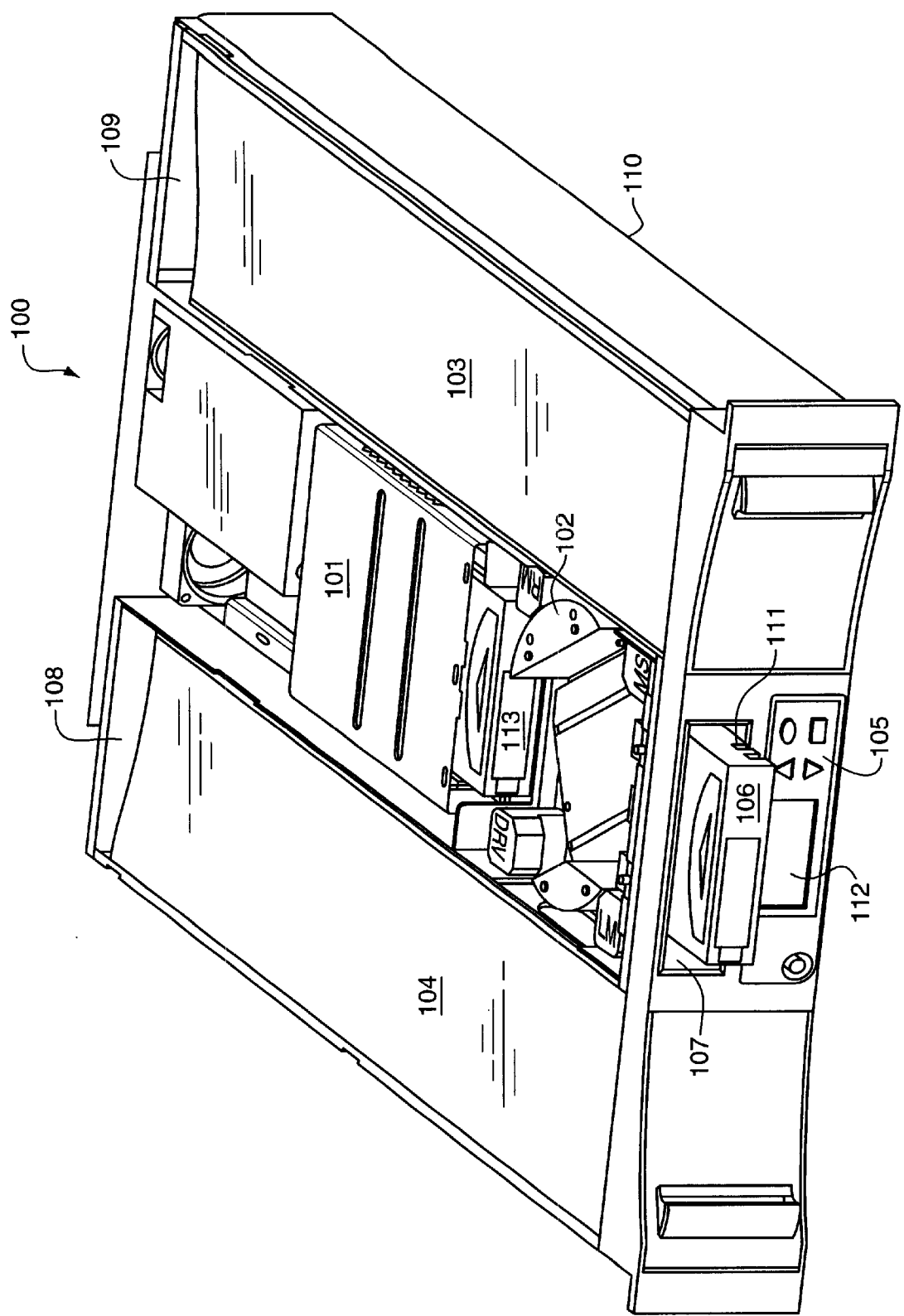
FIG. 1 illustrates an example of a tape cartridge autoloader/library system.
Figure 2:
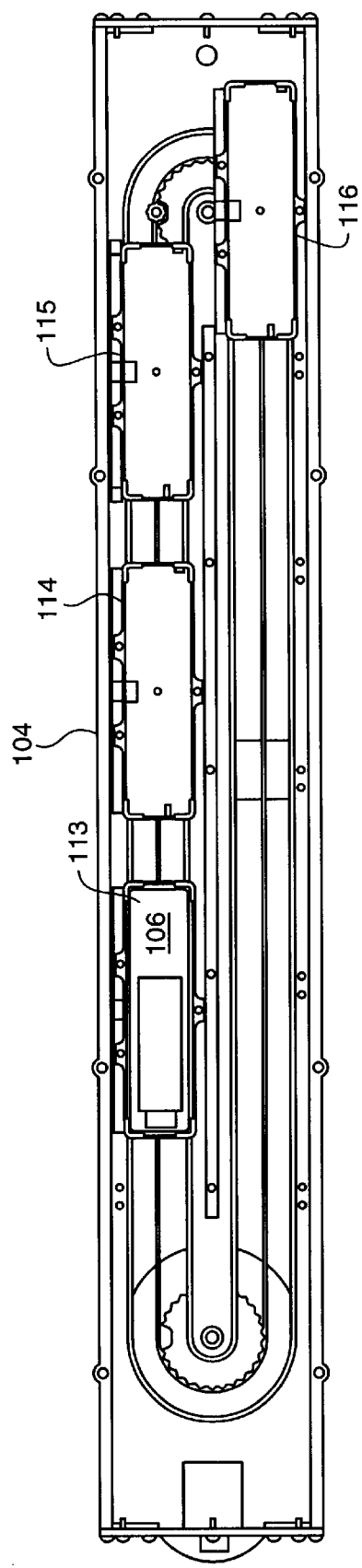
FIG. 2 illustrates an example of a tape cartridge transport magazine for the autoloader/library system of FIG. 1.

Tape Cartridge Autoloader/Library Systems—FIGS. 1 and 2

For purposes of illustration and not of limitation, various features and advantages of the present cartridge stop/compression pad will now be described within the context of an autoloader/library system configured to accommodate a plurality of DLT tape cartridges. It is to be understood that the following description with respect to the example of the autoloader/library system and DLT tape cartridges disclosed herein is not intended to limit the scope of the present invention. It would be obvious to one skilled in the art that the principles of the present invention could easily be applied to other tape libraries, autoloaders, autoloader/library systems and tape cartridge formats.

FIG. 1 depicts an example of an automated tape cartridge autoloader/library system 100. The primary components of the autoloader/library system 100 are a read/write tape drive 101, a tape cartridge picker 102, a single tape cartridge interface 107, and a pair of tape cartridge transport magazines, 103 and 104, enclosed in a housing 110. The autoloader/library system 100 also comprises a control panel 105 that receives control inputs from an operator and includes a user interface 112 to provide status information to the operator.

The autoloader/library system 100 is a complete tape cartridge library that stores, manages, and automatically exchanges a plurality of tape cartridges, e.g. 106 and 113, between the tape drive 101, the single cartridge interface 107, and the tape cartridge transport magazines, 103 and 104. The autoloader/library system 100 could also include multiple tape drives and could be configured to accommodate multiple tape media formats as a matter of design choice by simply incorporating the appropriate tape drive format into the autoloader/library system 100. Some examples of the tape cartridge media 106 include without limitation, DLT, LTO, 8 millimeter, and SDLT tape cartridges.

Advantageously, the autoloader/library system 100 includes a compact form factor due in large part to the cartridge picker 102. In one example of the autoloader/library system 100, the housing 110 including the tape cartridge transport magazines, 103 and 104, the tape drive 101, the cartridge picker 102, and all control elements including motors, circuitry, and processors, measures approximately three and one half inches in height and fits in a standard rack mount. Also, advantageously, the storage and management of the plurality of tape cartridges, e.g. 106 and 113, in the compact form factor of the autoloader/library system 100 is provided by the cartridge picker 102 in combination with the individual tape cartridge transport magazines, 103 and 104.

The tape cartridge transport magazines, 103 and 104, are each configured to receive and store a plurality of individual tape cartridges, e.g. 106, in a plurality of individual tape cartridge storage locations. The tape cartridge transport magazines, 103 and 104, are also configured to transport the individual tape cartridges, e.g. 106, in a vertical closed loop within the tape cartridge transport magazines, 103 and 104, so that any one of the stored tape cartridges can be positioned for selection by the cartridge picker 102. FIG. 2 depicts a cross sectional view of the interior of the tape cartridge transport magazine 104 used to illustrate the transportation of the tape cartridges within the tape cartridge transport magazines, 103 and 104. The plurality of tape cartridges are loaded into the tape cartridge transport magazines, 103 and 104, by sliding the individual tape cartridges, e.g. 106, into individual carriages, e.g. 113–116, in a horizontal relationship relative to the magazines, 103 and 104. The tape cartridges, e.g. 106, are transported in the magazine 104 by rotating the carriages 113–116 within the vertical closed loop to the different locations in the tape cartridge magazine 104.

The cartridge picker 102 is configured to rotate and exchange the individual tape cartridges, e.g. 106, with one of the tape drive 101, the magazine 104, the magazine 103, and the single cartridge interface 107. Advantageously, the use of the rotating cartridge picker 102 in combination with the transport mechanisms in the magazines, 103 and 104, significantly limits the operation required for a tape cartridge exchange. The cartridge picker 102 simply rotates between the tape cartridge transport magazines, 103 and 104, the single cartridge interface 107, and the tape drive 101, to exchange tape cartridges, e.g. 106. Advantageously, the autoloader/library system 100 configured with the cartridge picker 102 provides fast and efficient exchange of tape cartridges, e.g. 106, between the magazines, 103 and 104, the single cartridge interface 107, and the tape drive 101. Additionally, the rotating cartridge picker 102 in combination with the transport magazines, 103 and 104, permits a coplanar construction of the autoloader/library system 100 facilitating the compact form factor. It should also be noted that the tape cartridges, e.g. 106, are not flipped or re-oriented during transport within the tape cartridge transport magazines, 103 and 104, or during exchange with the cartridge picker 102. The tape cartridges, e.g. 106, are always in the proper orientation for retrieval by the cartridge picker 102, and for presentation to the tape drive 101, single cartridge interface 107, and tape cartridge magazines, 103 and 104.

Once selected by the cartridge picker 102, an individual tape cartridge, e.g. 106, could be provided to one of the following locations depending on the desired operation to be performed. If a read/write operation is desired, the cartridge picker 102 provides the selected tape cartridge 106 to the tape drive 101. If an ejection operation is desired, the cartridge picker 102 provides the selected tape cartridge 106 to the single cartridge interface 107 for retrieval by an operator. If a load balancing operation is desired, the cartridge picker 102 exchanges the tape cartridge 106 between tape cartridge transport magazine 103 and tape cartridge transport magazine 104. As will become apparent from the following description, the cartridge picker 102 could also provide the selected tape cartridge 106 to another tape cartridge transport magazine in another coupled tape cartridge autoloader/library system. Finally, the cartridge picker 102 could provide the selected tape cartridge, e.g. 106, to another tape drive in a coupled tape cartridge autoloader/library system.

The Cartridge Picker FIGS. 3–6

For purposes of illustration, the tape cartridge 106 is used throughout the following description of the cartridge picker 102. It should be understood, however, that the cartridge picker 102 could be easily designed according to the principles of the present invention to accommodate numerous tape cartridge formats other than the DLT format of the cartridge 106.

Figure 3:
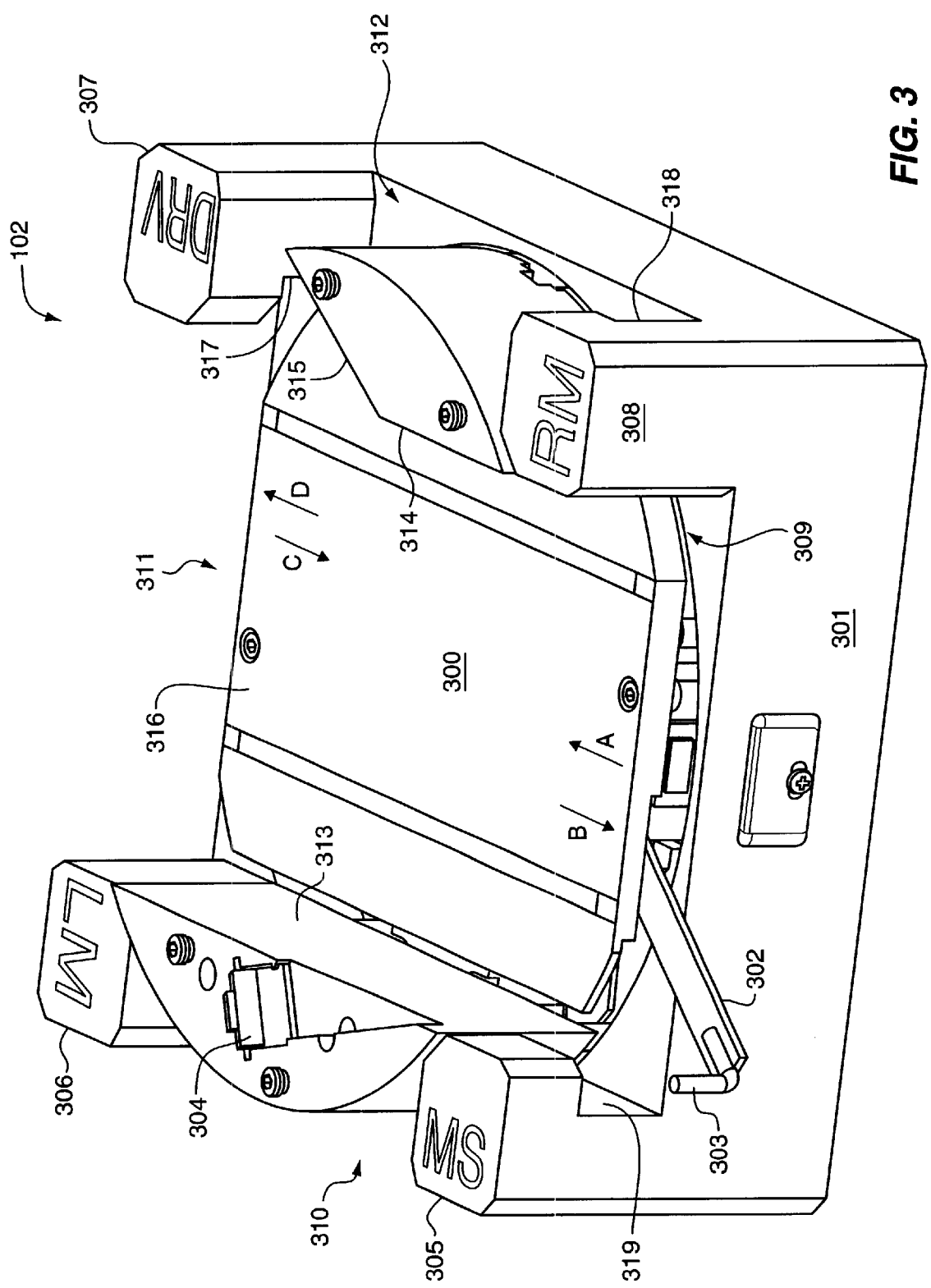
FIG. 3 illustrates an example of a tape cartridge picker for the autoloader/library system of FIG. 1.

FIGS. 3–6 depict various examples of the tape cartridge picker 102. Referring first to FIG. 3, the cartridge picker 102 comprises a translation arm 302 and a turntable 300 rotatably connected to a stationary base 301. The turntable 300, includes a central cavity 316 configured to receive the tape cartridge 106 on the turntable 300. Parallel walls, 313 and 314, and a wall 315 integrally formed at a thirty-degree angle to wall 314, define the central cavity 316. Alternatively, the wall 315 could be formed at other angles depending on the geometry of the cartridge. As will become apparent from the following description, the angle of the wall 315 permits the translation arm 302 to pass behind the tape cartridge 106 during unloading from the single cartridge interface 107. The translation arm 302 comprises a perpendicular cartridge pin 303 integrally formed in one end. The pin 303 is configured to engage or seat in a notch 111 (shown on FIG. 1) formed in the tape cartridge 106.

The cartridge picker 102 also comprises a bar code reader 304 for reading computer readable indicia on the tape cartridges. The bar code reader 304 could be configured in any suitable manner that permits the bar code reader 304 to read the indicia on the tape cartridges. In one example of the invention, the bar code reader 304 includes a mirror that reflects an image of the indicia on the tape cartridge to the bar code reader 304. Advantageously since the turntable 300 rotates, the bar code reader 304 could be located at numerous other locations on the cartridge picker 102 as a matter of design choice. Alternatively, in some applications, the bar code reader 304 could be separate from the picker 102 and located in the autoloader/library system 100.

The picker base 301 comprises four vertical columns 305–308 that define four cartridge exchange ports 309–312. As will become apparent from the following description, columns 305, 307, and 308 are undercut in portions 317–319 so that the columns 305, 307, and 308 do not interfere with the translation arm 302 during retrieval and delivery of the tape cartridge 106. Operationally, the turntable 300 rotates within the base 301 to exchange the tape cartridge 106 with the single cartridge interface 107, the tape drive 101, and the tape cartridge transport magazines, 103 and 104, through the exchange ports 309–312. Specifically, the turntable 300 exchanges the tape cartridge 106 with the magazine 103 through the exchange port 309, exchanges the tape cartridge 106 with the single cartridge interface 107 through the exchange port 310, exchanges the tape cartridge 106 with the magazine 104 through the exchange port 311, and exchanges the tape cartridge 106 with the tape drive 101 through the exchange port 312.

Figure 4:
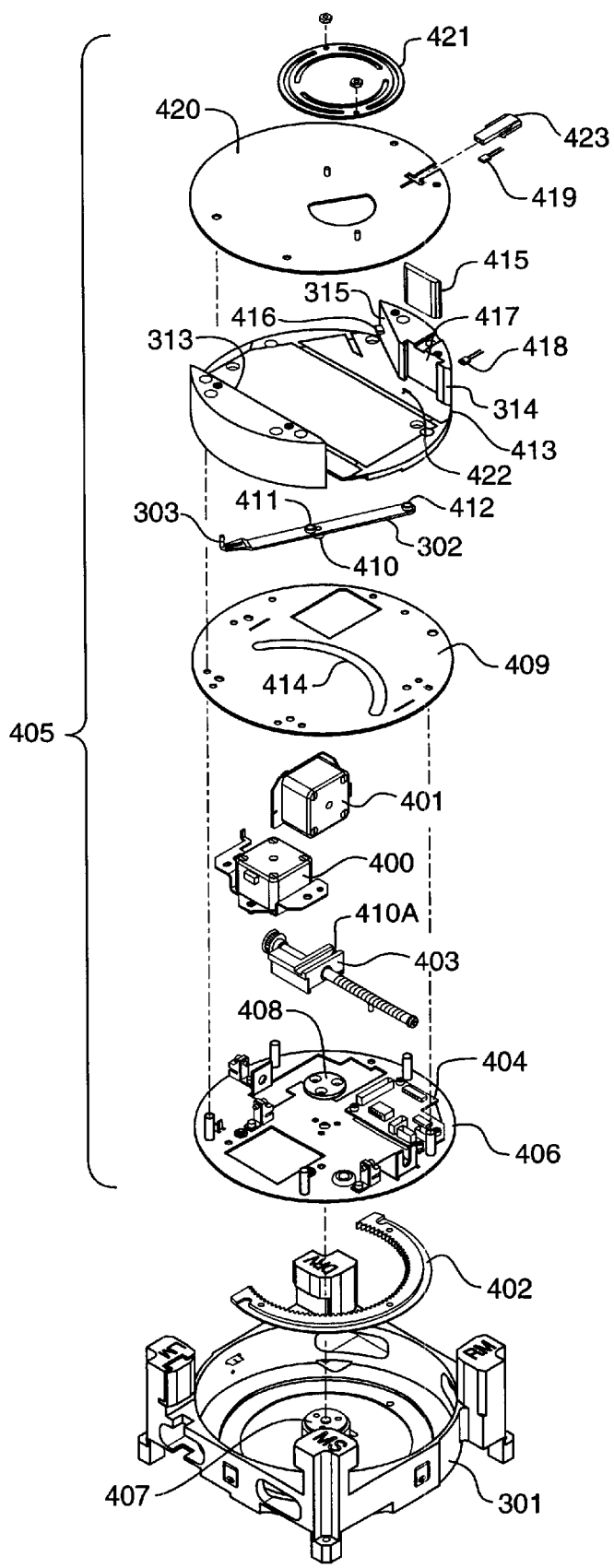
FIG. 4 illustrates an assembly view of the tape cartridge picker including the cartridge stop/compression pad according to the present invention.
Figure 5:
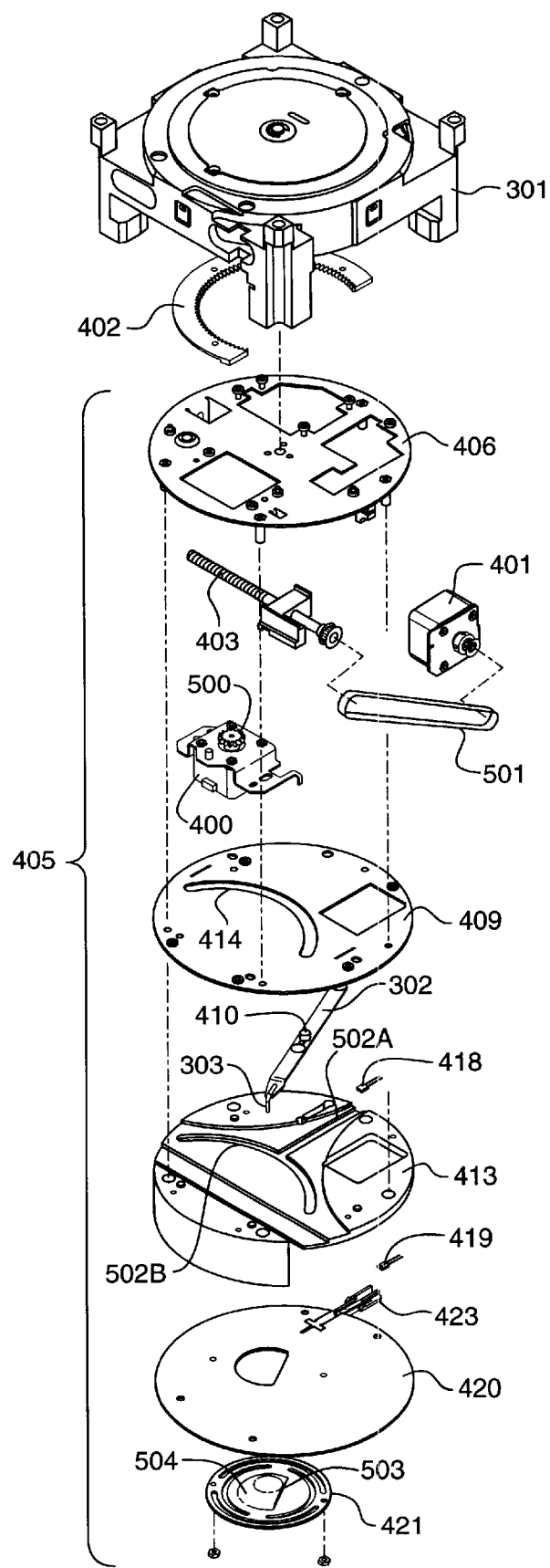
FIG. 5 illustrates another assembly view of the tape cartridge picker including the cartridge stop/compression pad according to the present invention.
Figure 6:
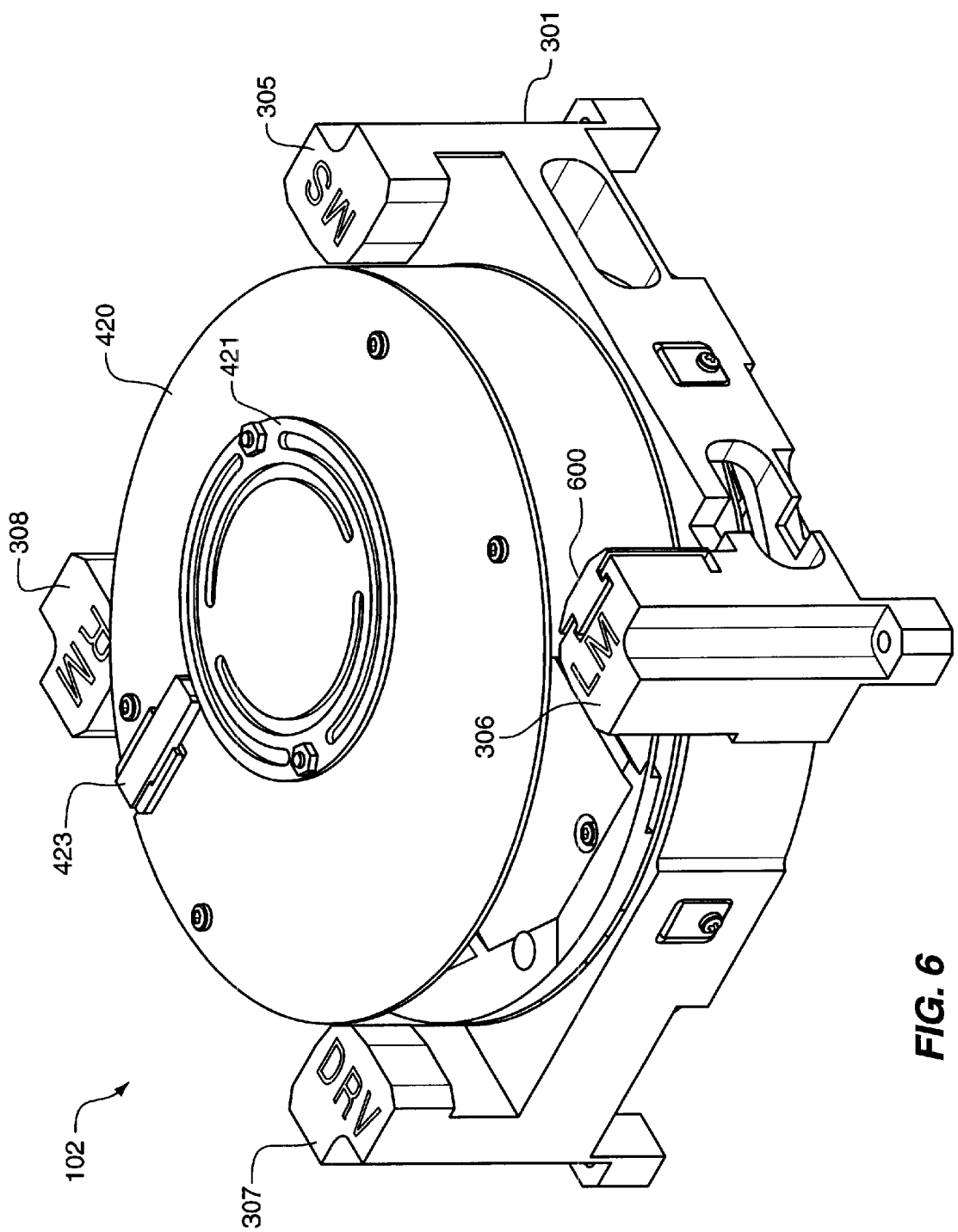
FIG. 6 illustrates an assembled view of the tape cartridge picker.

FIGS. 4 and 5 illustrate assembly view of the tape cartridge picker 102, with FIG. 4 being a top down assembly view and FIG. 5 being a bottom up assembly view. FIG. 6 illustrates a perspective-assembled view of the cartridge picker 102. Two motors control the operation of the cartridge picker 102. A rotation motor 400 rotates a spur gear 500 that couples to a ring gear 402 mounted in the base 301 to rotate the turntable assembly 405. A translation motor 401 and lead screw 403, connected by a belt 501, operate to extend and retract the translation arm 302. The operation of the picker 102 is controlled by control circuitry 404, mounted on a bottom plate assembly 406. Flex cables (not shown) fed up from the bottom of the base 301, provide power to the control circuitry 404. Those skilled in the art will appreciate that the rotation motor 400 could also be located within the autoloader/library system 100 or connected to the base 301. In this case the rotation of the picker 102 could be accomplished using a belt and mating drive gear connected to the bottom plate assembly 406.

The turntable assembly 405 rotates around the ring gear 402, which is internally coupled to the base 301. Alternatively, those skilled in the art will appreciate that the ring gear 402 could be integrally formed in the base 301. The bottom plate assembly 406 is fastened by a coupling plate 408 to a bearing member 407 centrally located in the base 301. The translation motor 401 and the rotation motor 400 mount to the bottom plate assembly 406 and are housed between the bottom plate assembly 406 and a middle plate 409. The translation arm 302 is slidably mounted between the middle plate 409 and the cavity portion 413 of the turntable 300. The translation arm 302 includes a roller 410 that passes through channel 414 with clearance in the middle plate 409 and is driven by channel 410(a) in the lead screw 403. Rollers 411 and 412 ride in channels 502(b) and 502(a) respectively formed in the bottom of the cavity portion 413.

A plate 420 provides a top cover for the turntable assembly 405. The plate 420 also provides a mount for a cartridge stop/compression pad 421. As will become apparent from the following description, the cartridge stop/compression pad 421 stops the insertion of the tape cartridge 106 from the single cartridge interface 107 to position the cartridge 106 for engagement by the translation arm 302 and the pin 303. When the tape cartridge 106 is received from all other locations, i.e. the magazines 103 and 104 and the tape drive 101, the cartridge stop/compression pad 421 functions as a compression pad to permit the cartridge 106 to be fully received into the cavity 316.

The wall 314 of the cavity portion 413 includes a flex wall 415 configured to slide into notch 417. The flex wall 415 is spring loaded within the notch 417 and functions to bias the tape cartridge 106 against the opposing wall 313 when the tape cartridge 106 is received in the cavity 316. Advantageously, this prevents the pin 303 from disengaging from the cartridge notch 111 when the tape cartridge 106 is loaded and unloaded from the cavity 316. The wall 315 includes a key 416 configured to mate with a corresponding groove on the side of the tape cartridge 106 to prevent mis-insertion of the tape cartridge 106 when the tape cartridge 106 is received from the single cartridge interface 107. Advantageously, this prevents an operator from forcing the tape cartridge 106 into the single cartridge interface 107 in the wrong orientation and damaging the cartridge picker 102.

Figure 20:
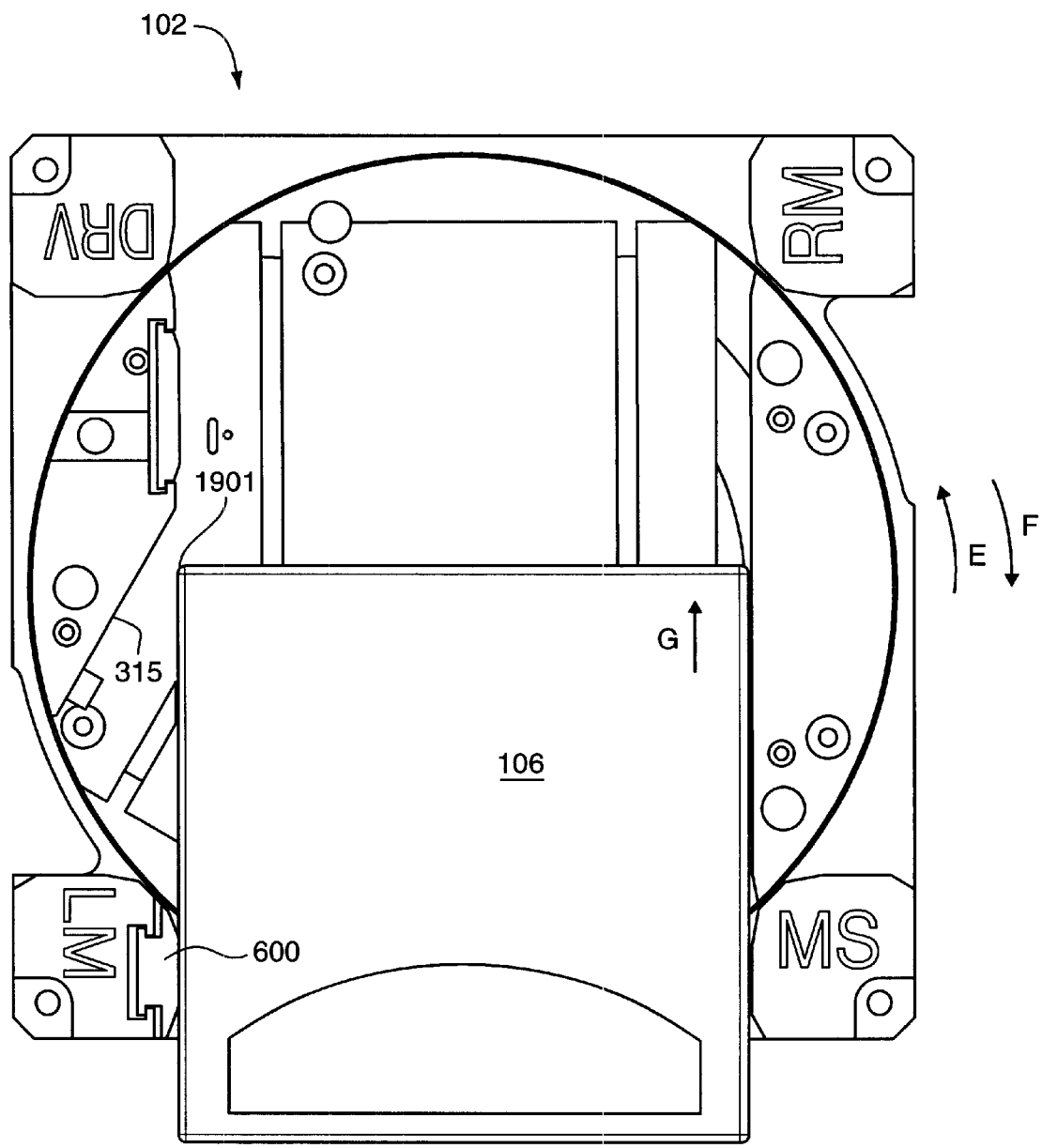
FIG. 20 is another plan view illustrating the operation of the tape cartridge picker.

Referring to FIG. 6, a second flex wall 600 is included on the column 306. The second flex wall 600 is also spring loaded to guide the tape cartridge 106 during insertion from the single cartridge interface 107, and prevents the pin 303 from disengaging from the cartridge notch 111. Referring to FIG. 20, flex wall 600 also prevents the cartridge 106 from rotating counter clockwise during transition onto the cavity 316, so that the corner 1901 does not rotate and collide with wall 315 as the translation arm 302 pulls the cartridge 106 in the direction (G).

The cartridge picker 102 also includes a cartridge present sensor comprising an emitter portion 418 and a detector portion 419. The emitter portion 418 is mounted on the underside of the cavity 413 of the cartridge picker 102 and aligns with the aperture 422 to provide a signal to the detector portion 419. The detector portion 419 is mounted in the housing 423, which couples to the plate 420. Operationally, a cartridge present condition is indicated when the tape cartridge 106, inserted into the cavity 316, blocks the aperture 422 and the detector portion 419 detects no single. Similarly, a cartridge not present condition is indicated by a continuous reception of signal by the detector portion 419 from the emitter portion 418. Those skilled in the art will appreciate that the detector portion 419 and the emitter portion 418 could be easily reversed.

Tape Cartridge Picker Operation FIGS. 7–22

When the tape cartridge 106 is exchanged between the cartridge picker 102 and the tape drive 101, or between the cartridge picker 102 and the magazines 103 and 104, the cartridge 106 is received in the cavity 316 in direction (A) and ejected from the cavity 316 in direction (B) as exemplified in FIG. 3. In the context of this application this is defined as the front of the turntable 300 regardless of the exchange port, e.g. 309, that it is aligned with. Similarly, when the tape cartridge 106 is exchanged between the cartridge picker 102 and the single cartridge interface 107, the cartridge 106 is received in the cavity 316 from the opposite end of the cavity 316 in direction (C) and ejected from the cavity 316 in direction (D). In the context of the present application this is defined as the rear of the turntable 300 regardless of the exchange port, e.g. 309, that it is aligned with. As will become apparent from the following description, this permits the cartridge to always be oriented in the same direction when it is located in the cavity 316.

Figure 12:
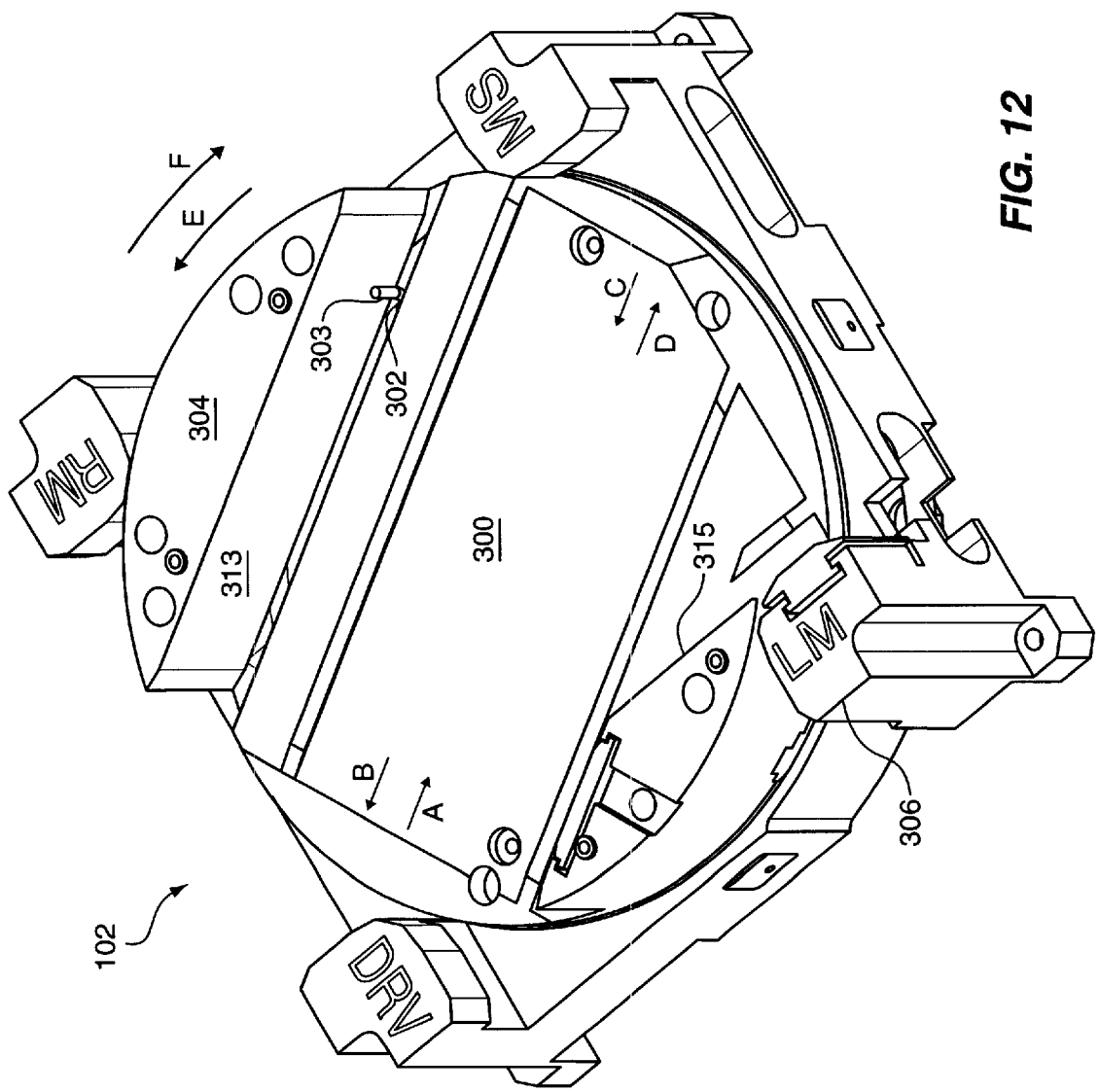
FIG. 12 is a perspective view illustrating the operation of the tape cartridge picker.
Figure 13:
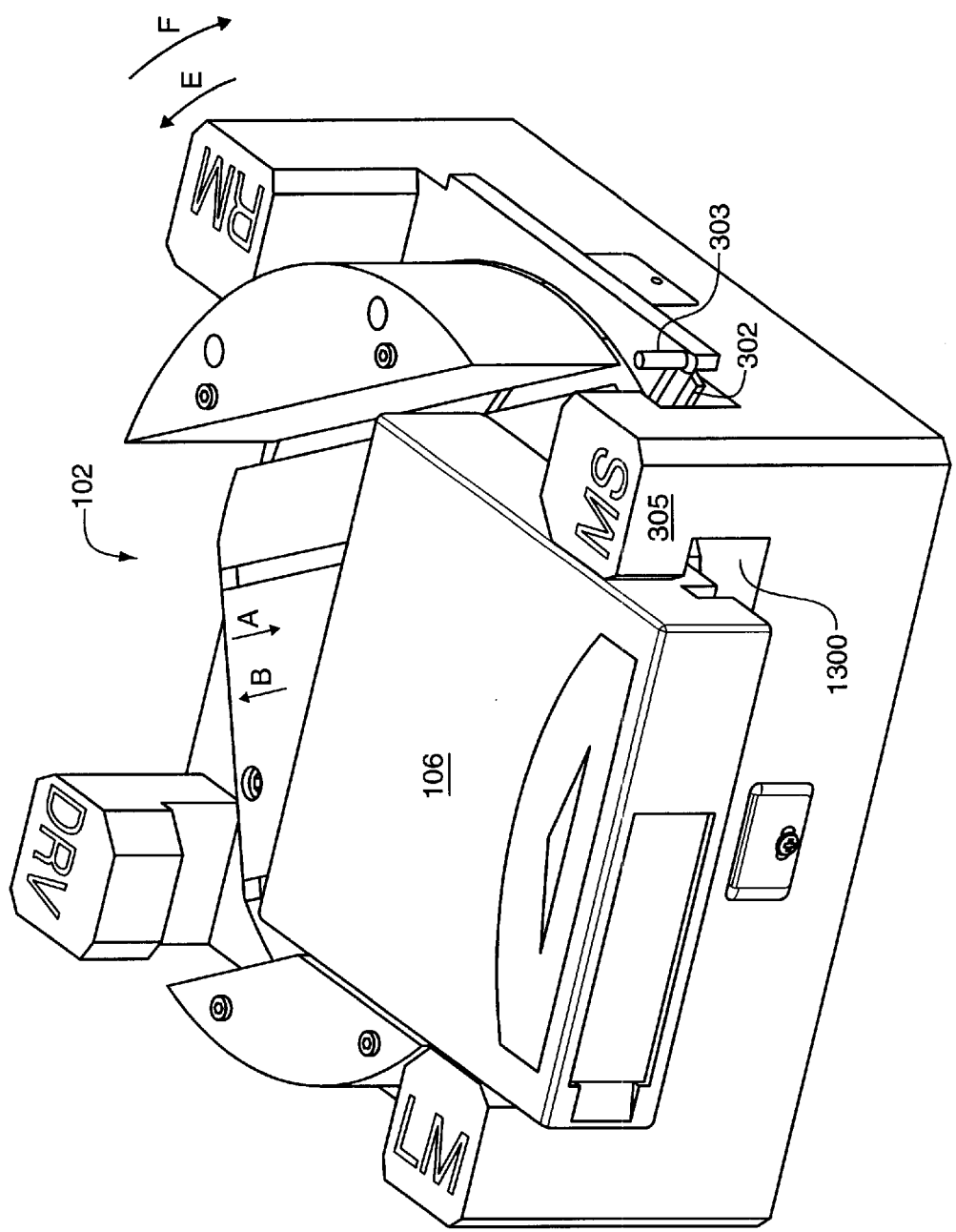
FIG. 13 is another perspective view illustrating the operation of the tape cartridge picker.

The translation arm 302 has three primary positions but, as will also become apparent, other positions are used during the exchange of tape cartridges from the tape drive 101, the single cartridge interface 107 and the magazines 103 and 104. The first primary position, shown in FIG. 12, is defined as the home position. In the home position the turntable 300 is free to rotate regardless of whether the tape cartridge 106 is present in the cavity 316 or absent from the cavity 316. Additionally, the home position is used regardless of whether the tape cartridge 106 is received from the front or the rear of the turntable 300. The second primary position, shown in FIG. 3, is defined as the forward extension position. In the forward extension position, the translation arm 302 is ready to engage the tape cartridge 106 and pull the cartridge 106 in the direction (A) from the tape drive 101, or the magazines 103 and 104 into the cavity 316. The third primary position, shown in FIG. 13, is defined as the reverse extension position. In the reverse extension position, the translation arm 302 is positioned to engage the tape cartridge 106 and pull the cartridge 106 in the direction (C) from the single cartridge interface 107 into the cavity 316.

Figure 7:
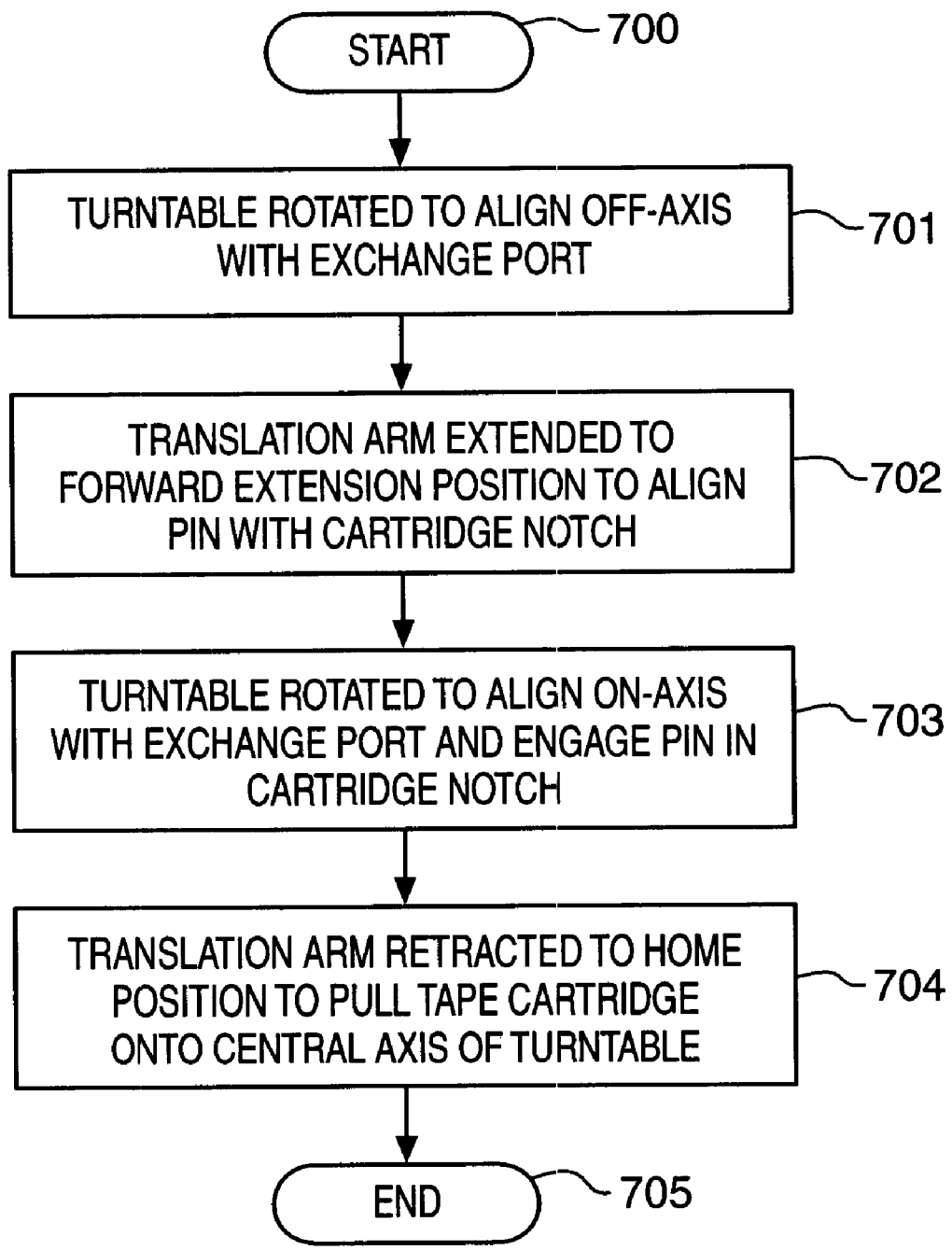
FIG. 7 is a flow chart illustrating an example of the operation of the tape cartridge picker.

FIG. 7 is a flow chart illustrating the operation of the cartridge picker 102 during retrieval of the tape cartridge 106 from the tape cartridge transport magazine 103. Those skilled in the art will appreciate that the operation is substantially identical for retrieval of the tape cartridge 106 from the tape cartridge transport magazine 104 and for retrieval of the tape cartridge 106 following ejection from the tape drive 101.

When one of the tape cartridge transport magazines, 103 or 104, is inserted into the autoloader/library system 100, the autoloader/library system 100 performs an inventory operation using sensors to determine which carriages, e.g. 113–116, contain tape cartridges and which carriages are empty. Thus, the autoloader/library system 100 automatically maintains an inventory of loaded tape cartridges during operation. The autoloader/library system 100 also maintains data indicative of the location of specific tape cartridges within the magazines, 103 and 104, so that a desired tape cartridge can be provided to the cartridge picker 102.

Figure 14:
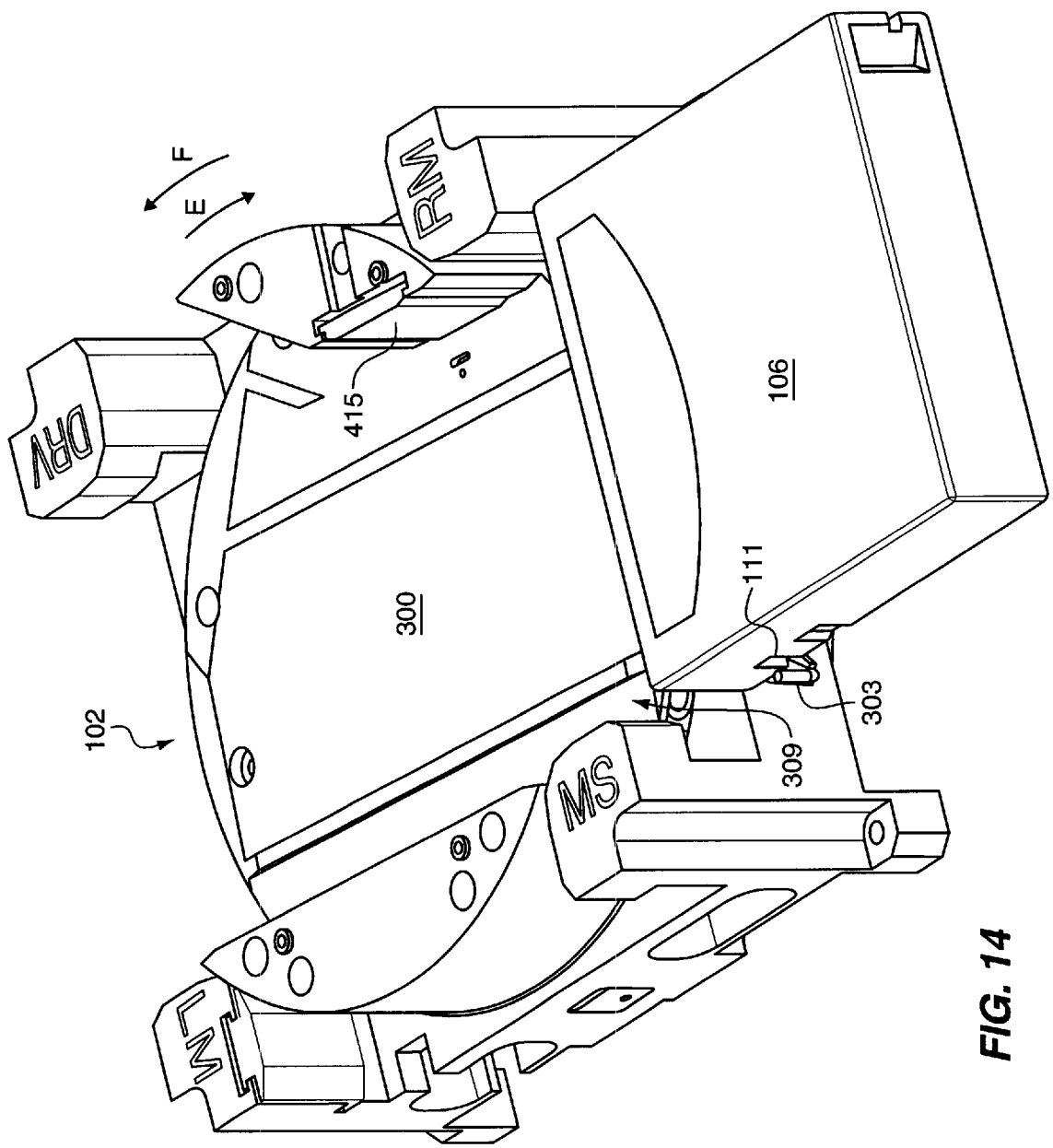
FIG. 14 is another perspective view illustrating the operation of the tape cartridge picker.

On FIG. 7 the operation begins at step 700 with the translation arm 302 in the home position of FIG. 12. At step 701, the turntable 300 is rotated to align off-axis with the exchange port 309, as shown in FIG. 14. In the context of the present invention, an off-axis alignment is defined as any position of the turntable 300 where either the rear of the turntable 300 or the front of the turntable 300 is not aligned with one of the exchange ports 309–312. Similarly, an on-axis alignment is defined as any position of the turntable 300 where either the rear of the turntable 300 or the front of the turntable 300 is aligned with one of the exchange ports 309–312. In this case, the off-axis alignment refers to aligning the front of the turntable 300 approximately three and one half degrees past the exchange port 309 in the direction (E) and permits extension of the translation arm 302 to the forward extension position without contacting the tape cartridge 106. Alternatively, the off-axis alignment could be any position that permits the translation arm 302 to be extended to the forward extension position without contacting the tape cartridge 106.

Figure 15:
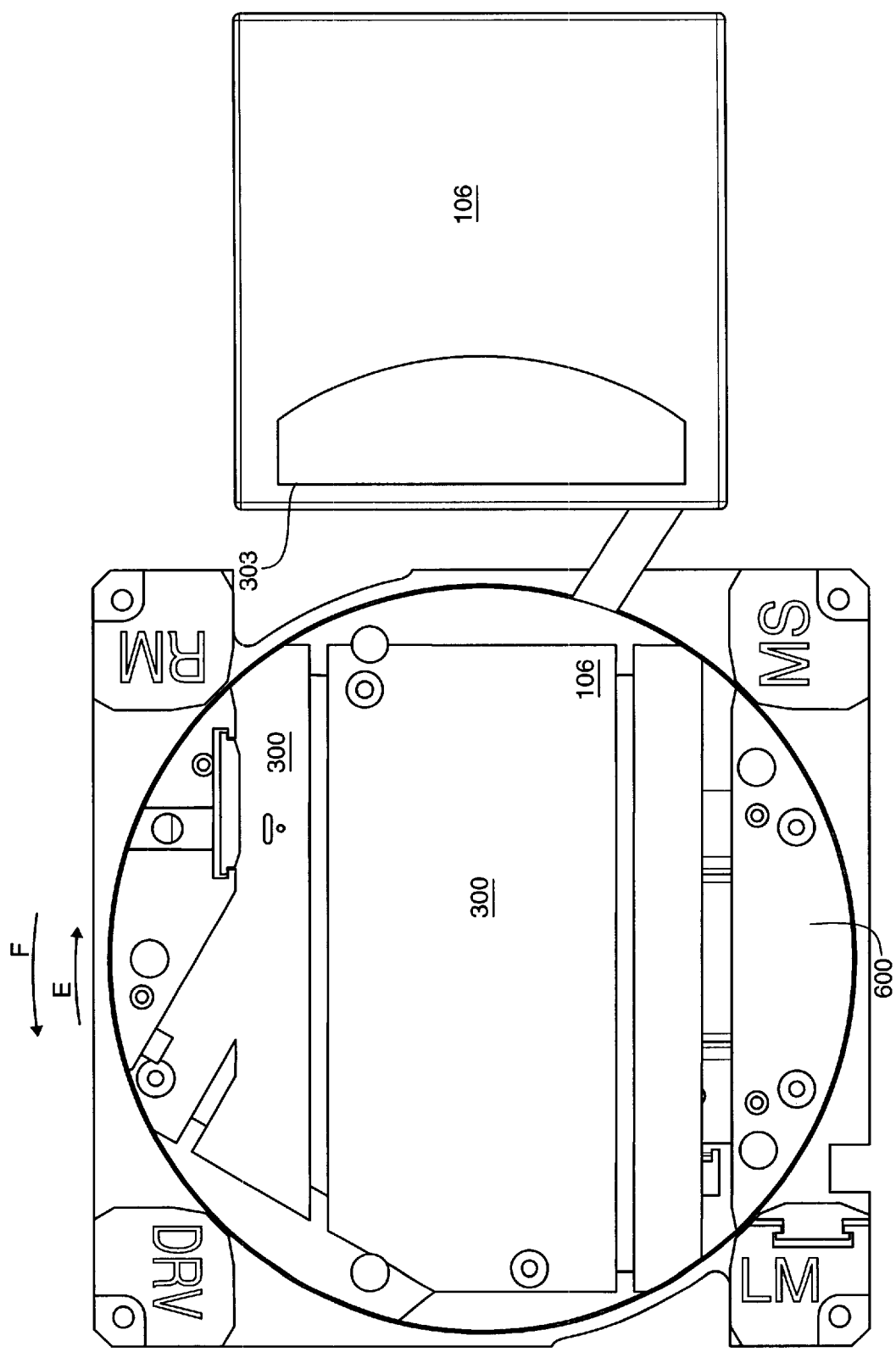
FIG. 15 is a plan view illustrating the operation of the tape cartridge picker.
Figure 16:
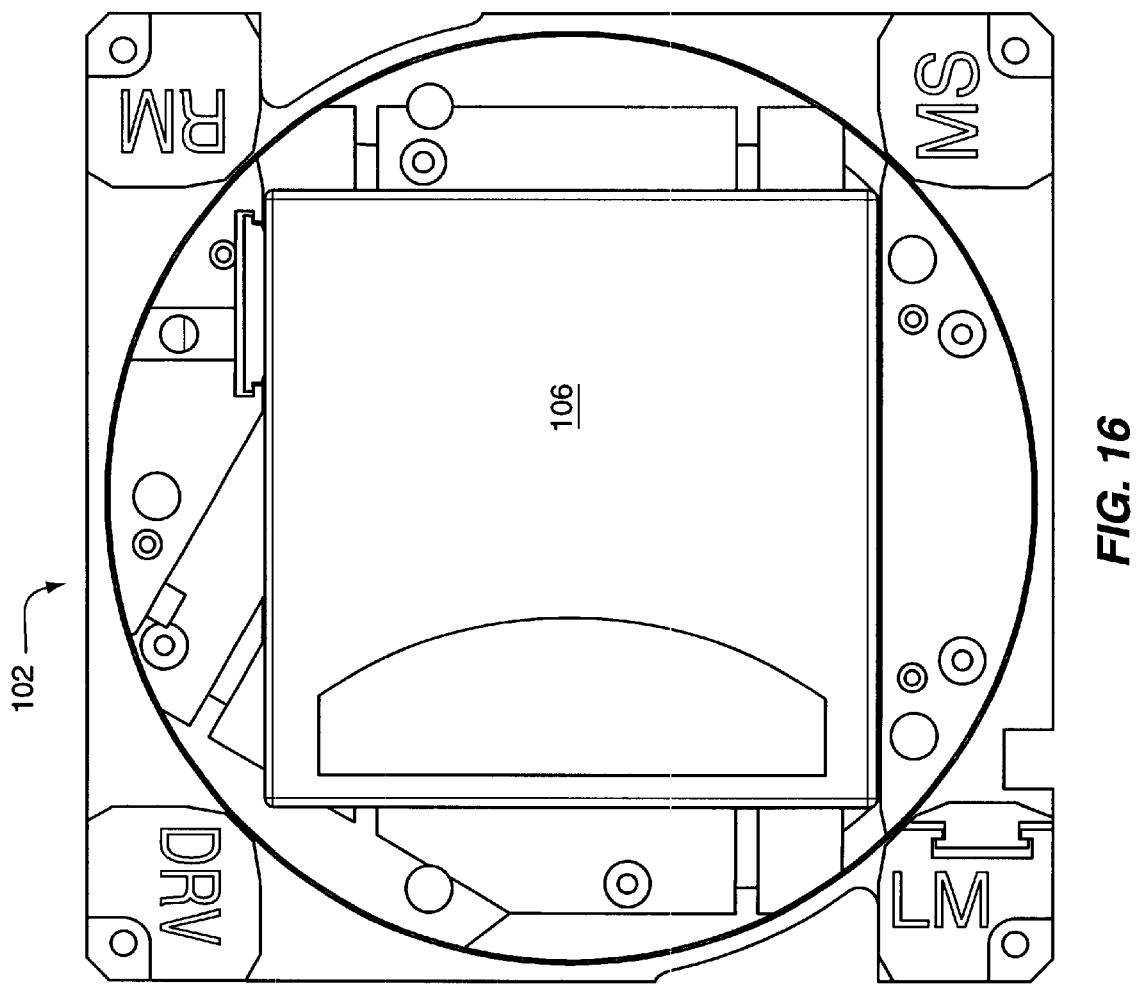
FIG. 16 is another plan view illustrating the operation of the tape cartridge picker.

Substantially simultaneously, the transport magazine 103 transports the carriage, e.g. 113, containing the desired tape cartridge 106 to the storage location aligned with the cartridge picker 102. At step 702, the translation arm 302 is extended to the forward extension position so that the pin 303 is aligned with the cartridge notch 111 in the tape cartridge 106. At step 703 the turntable is rotated three and one half degrees in the direction (F) to align the front of the turntable 300 on-axis with the exchange port 309 and engage or seat the pin 303 in the cartridge notch 111, as shown in FIG. 15. At step 704, the translation arm 302 is retracted to the home position of FIG. 12 to pull the tape cartridge 106 into the cavity 316 and onto the central axis of the turntable 300, as shown in FIG. 16. The operation ends at step 705. Advantageously, once in this position, the turntable 300 and cartridge 106 may be freely rotated to deliver the tape cartridge 106 to the tape drive 101, the magazine 104, or the single cartridge interface 107.

Figure 8:
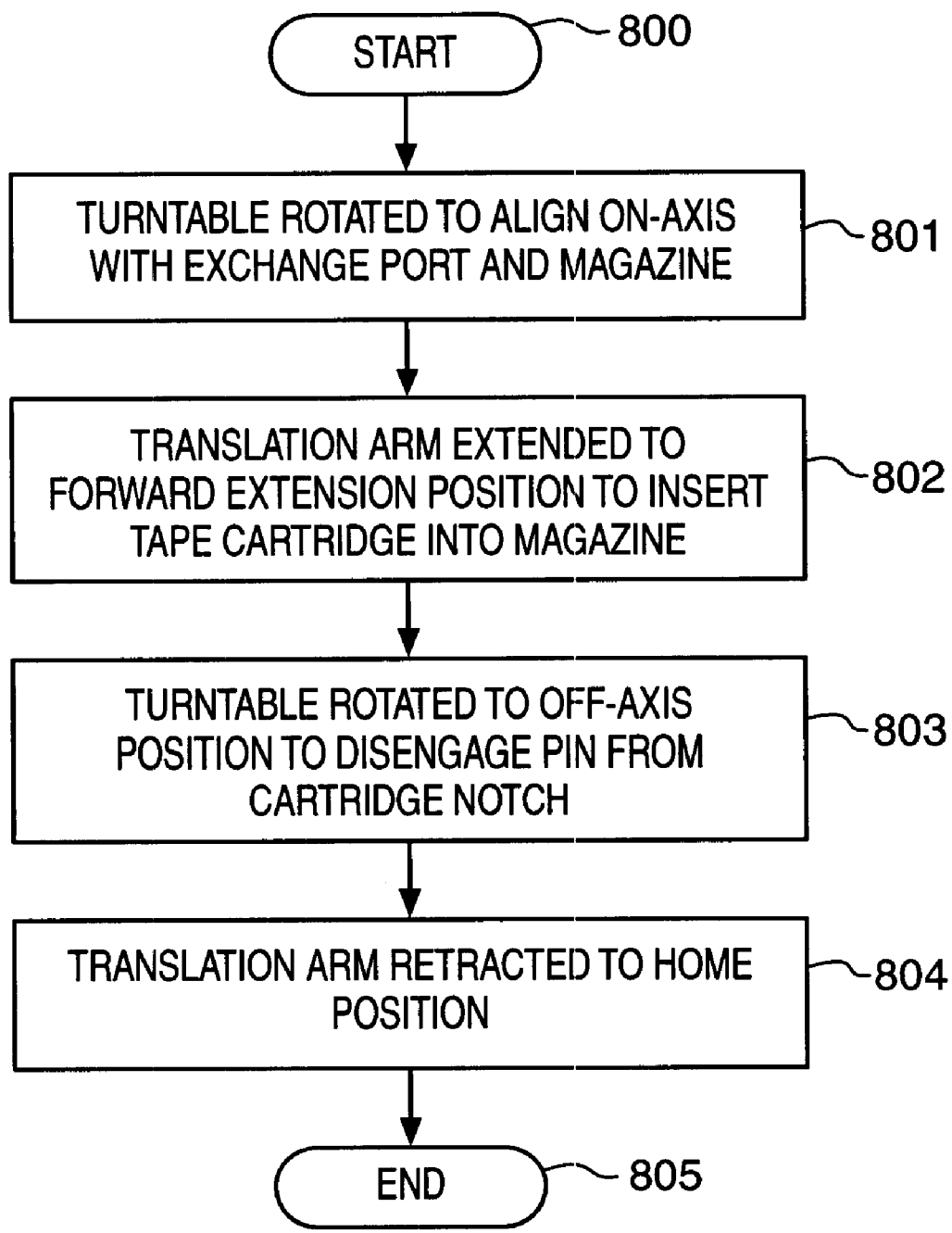
FIG. 8 is a flow chart illustrating another example of the operation of the tape cartridge picker.

FIG. 8 is a flow chart illustrating the delivery of the tape cartridge 106 to the tape cartridge transport magazine 104. Those skilled in the art will appreciate that the operation is substantially identical for delivery of the tape cartridge 106 to the tape cartridge transport magazine 103.

On FIG. 8, the operation begins at step 800 with the tape cartridge 106 loaded onto the cartridge picker 102 as described in FIG. 7. At step 801, the turntable 300 is rotated to align the front of the turntable on-axis with the exchange port 311 and the tape cartridge magazine 104. Substantially simultaneously, the transport magazine 104 transports an empty carriage, e.g. 114, to the storage location aligned with the cartridge picker 102. At step 802, the translation arm 302 is extended to the forward extension position to insert the tape cartridge 106 into the carriage 114 in the tape cartridge magazine 104, as exemplified by FIG. 15. At step 803, the turntable 300 is again rotated in the direction (E) to the three and one half degrees off-axis position to disengage the pin 303 from the cartridge notch 111, as exemplified by FIG. 14. At step 804, the translation arm is retracted to the home position of FIG. 12, so that the turntable 300 is free to rotate and perform additional operations and the operation ends at step 805.

Figure 9:
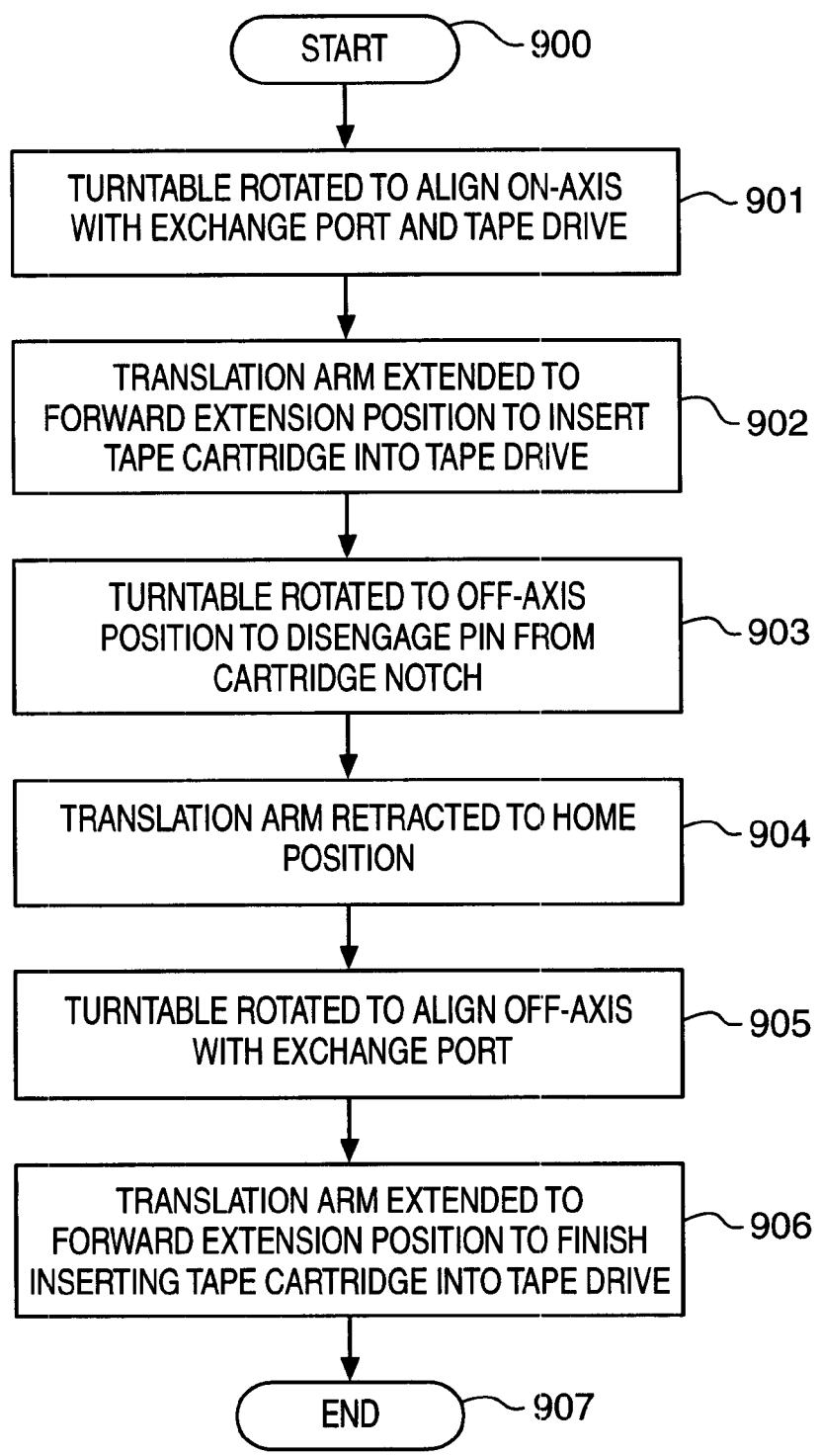
FIG. 9 is a flow chart illustrating another example of the operation of the tape cartridge picker.
Figure 17:
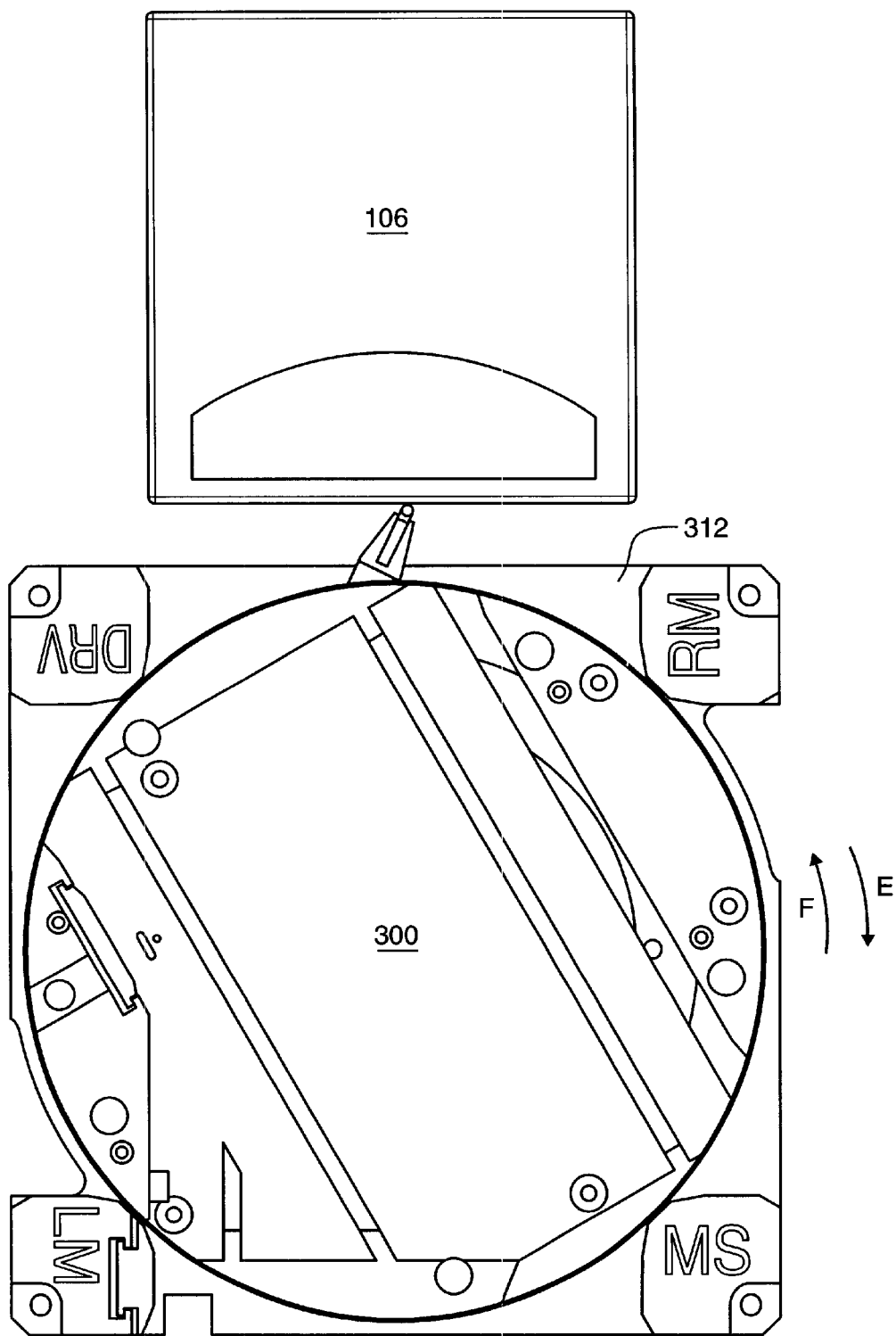
FIG. 17 is another plan view illustrating the operation of the tape cartridge picker.

FIG. 9 is a flow chart illustrating the delivery of the tape cartridge 106 to the tape drive 101. On FIG. 9, the operation begins at step 900 with the tape cartridge 106 loaded onto the cartridge picker as described in FIG. 7. At step 901, the turntable 300 is rotated to align the front of the turntable 300 on-axis with the exchange port 312 and the tape drive 101. At step 902, the translation arm 302 is extended to the forward extension position to insert the tape cartridge 106 into the tape drive 101, as exemplified by the insertion shown in FIG. 15. It should be noted that although FIG. 15 shows an insertion through the exchange port 309 aligned with the magazine 103 the operation is identical for insertion through the port 312 aligned with the tape drive 101. Those skilled in the art will also appreciate that the tape cartridge 106 is only partially inserted into the tape drive 101 at this point to prevent the translation arm 302 from contacting the tape drive 101. At step 903, the turntable 300 is again rotated in the direction (E) to the three and one half degrees off-axis position to disengage the pin 303 from the cartridge notch 111, as exemplified by FIG. 14. At step 904, the translation arm 302 is retracted to the home position of FIG. 12 so that the turntable 300 is free to rotate. Alternatively, the translation arm 302 only need be retracted far enough for the picker 102 to rotate without interference from the cartridge 106. At step 905, the turntable is rotated in direction (F) so that it is aligned approximately thirty degrees off-axis with the exchange port 312, and the translation arm 302 is behind the tape cartridge 106, as shown in FIG. 17. It should be noted that the thirty-degree rotation is not essential but rather advantageously adds mechanical advantage and permits the translation arm 302 to push on the center of the cartridge 106. At step 906, the translation arm is again extended to a forward extension position to finish inserting the tape cartridge 106 into the tape drive 101. Those skilled in the art will appreciate that because the pin 303 is now behind the tape cartridge 106 rather than engaged in the notch 111, the forward extension of the translation arm 302 is now able to complete the insertion of the tape cartridge 106 into the tape drive 101. The operation ends at step 907.

Figure 10:
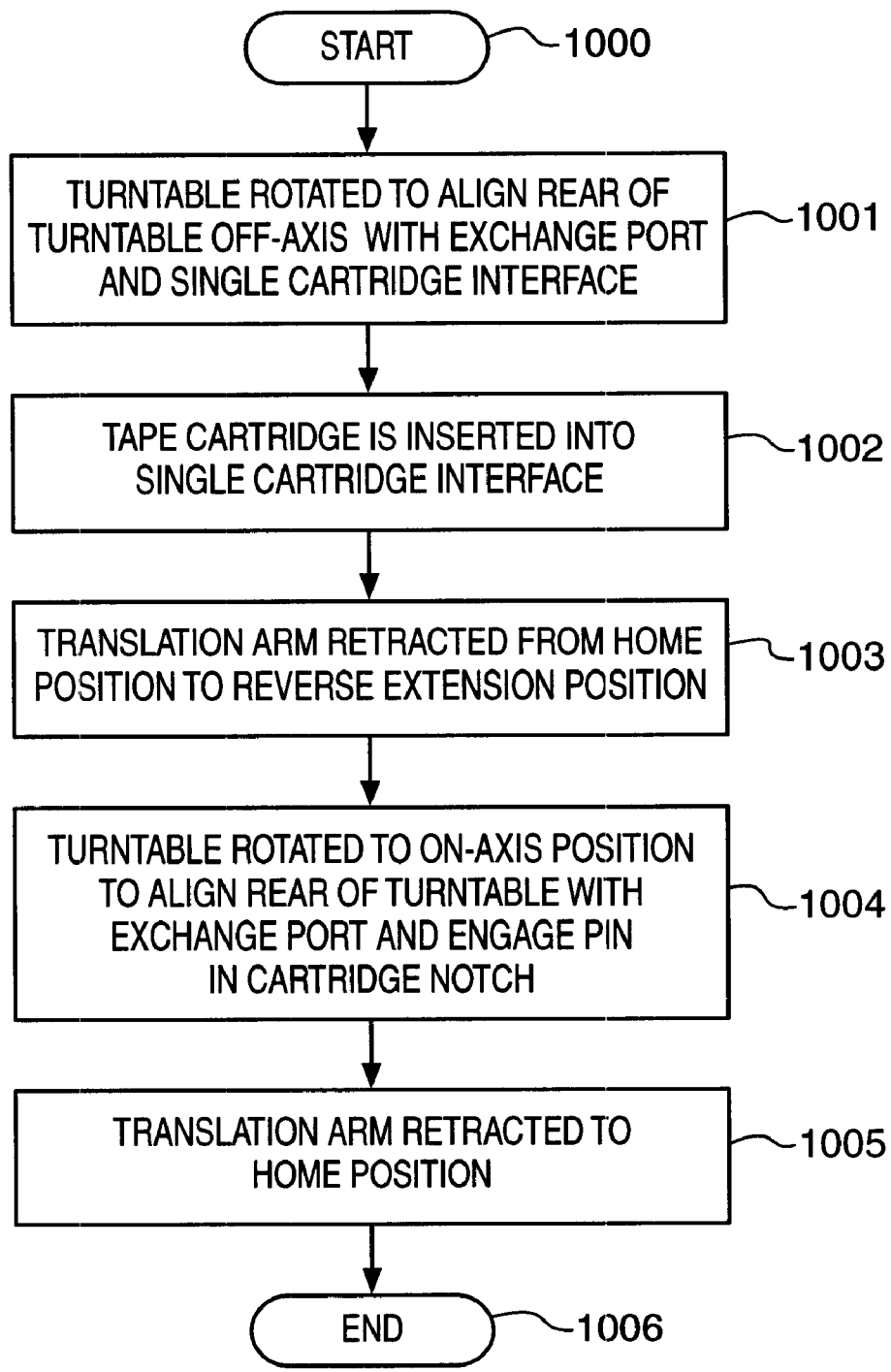
FIG. 10 is a flow chart illustrating another example of the operation of the tape cartridge picker.
Figure 18:
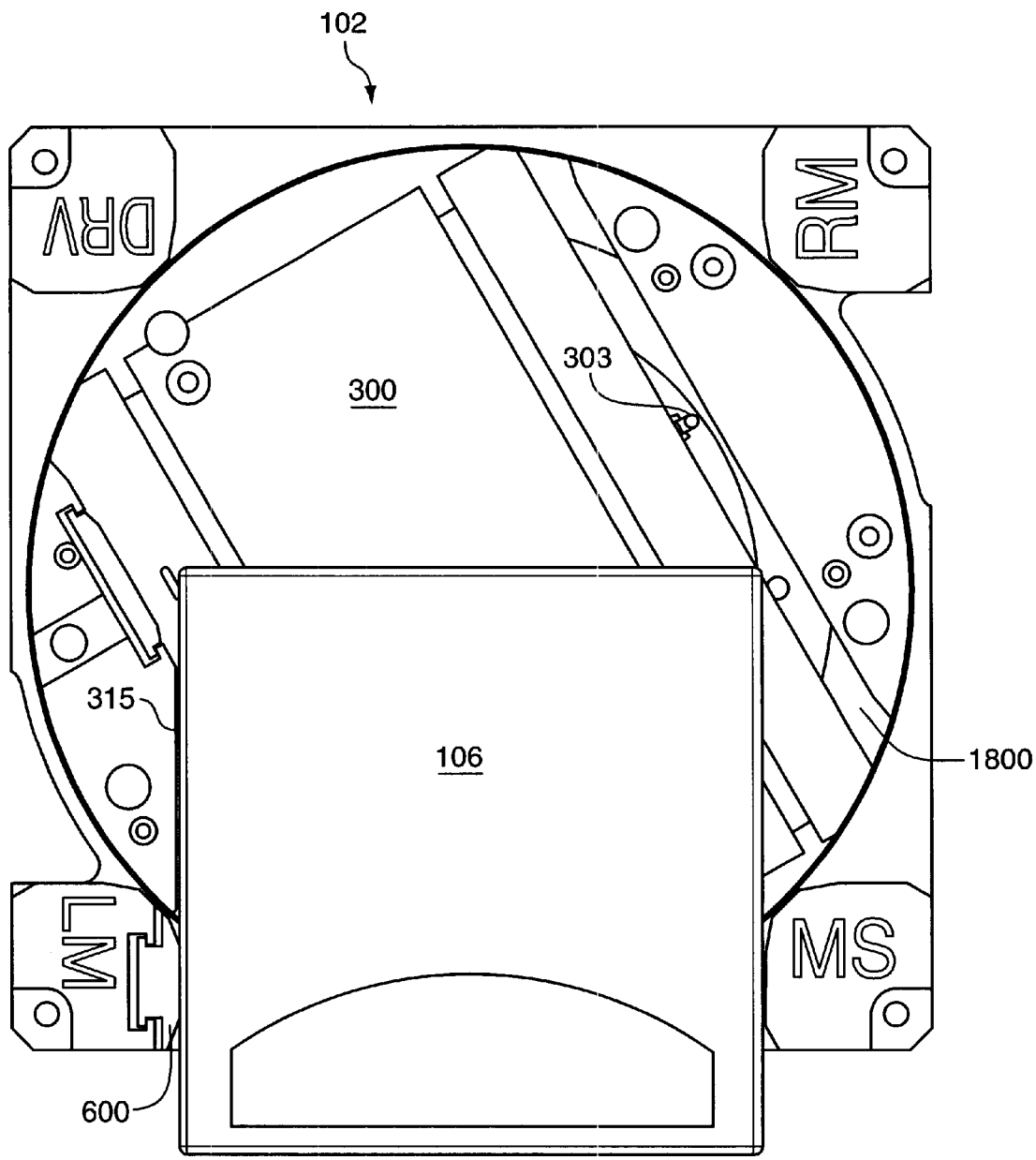
FIG. 18 is another plan view illustrating the operation of the tape cartridge picker.

FIG. 10 is a flow chart illustrating the receipt of the tape cartridge 106 from the single cartridge interface 107. On FIG. 10, the operation begins at step 1000. At step 1001, the turntable 300 is rotated in direction (E) to align the rear of the turntable 300 approximately thirty-degrees off-axis with the exchange port 310 and the single cartridge interface 107, as shown in FIG. 12. It should be noted that at step 1001, the translation arm 302 is in the home position and the wall 315 is aligned with the column 306. At step 1002, an operator inserts the tape cartridge 106 into the single cartridge interface 107, as shown in FIG. 18. The flex wall 600 operates to guide the tape cartridge 106 during insertion. Specifically, the flex wall 600 prevents the tape cartridge 106 from rotating counter clockwise during insertion and running into wall 315, thus preventing jamming. As the tape cartridge 106 is inserted into the single cartridge interface 107, the key 416, on the wall 315, engages a conventional slot defined in the side of the tape cartridge 106. Advantageously, the key 416 only permits the tape cartridge 106 to be inserted into the single cartridge interface 107 in one orientation.

Figure 19:
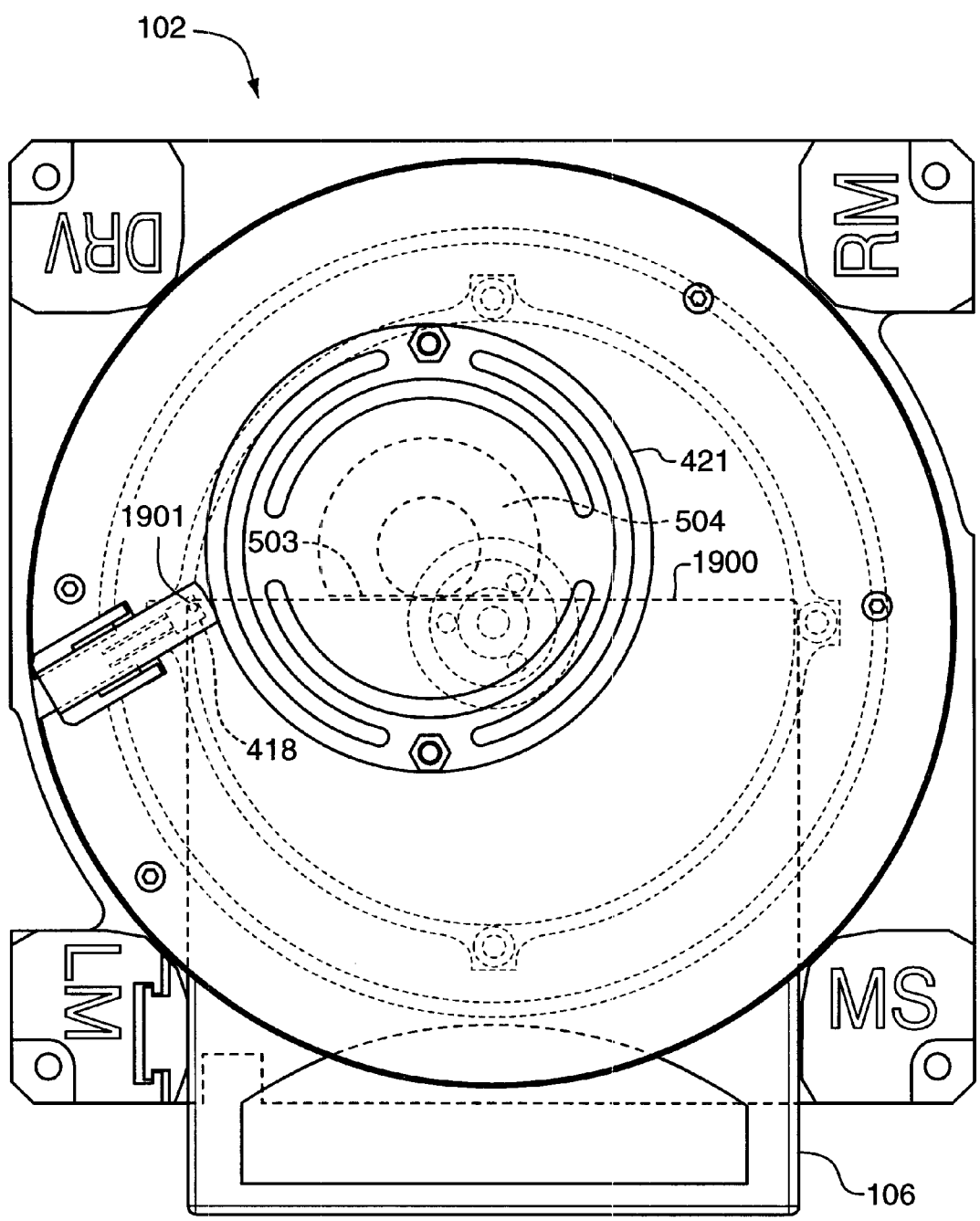
FIG. 19 is a plan view illustrating the operation of the cartridge stop/compression pad according to the present invention.

The cartridge stop/compression pad 421 is configured to stop the insertion of the tape cartridge 106 when the face 1900 of the tape cartridge 106 contacts the planar portion 503 of the cartridge stop/compression pad 421 as shown in FIG. 19. In the stopped position, the tape cartridge 106 is positioned so that pin 303 will align with and engage the cartridge notch 111 when the turntable 300 is rotated. Advantageously, the cartridge stop/compression pad 421 only functions to stop the tape cartridge when the turntable is in the position of FIG. 18. In all other positions, the tape cartridge 106 contacts the beveled portion 504 of the cartridge stop/compression pad 421 causing the cartridge stop/compression pad 421 to function as a compression pad and expand vertically upward to permit the cartridge to be fully received into the cavity 316. Thus, when the cartridge 106 is retrieved from the transport magazines, 103 and 104, or the tape drive 101, the cartridge picker 102 is able to pull the cartridge 106 past the cartridge stop/compression pad 421 as the compression pad portion of the cartridge stop/compression pad 421 expands vertically upward.

In the stopped position of FIG. 19, the corner 1901 of the tape cartridge 106 blocks the emitter 418 of the cartridge present sensor to indicate that a cartridge present condition. Advantageously, this permits the cartridge picker 102 to automatically sense the cartridge 106 during insertion from the single cartridge interface 107 and begin loading the cartridge 106 into the cavity 316 as described below. Alternatively, the loading could begin in response to an input received in the control panel 105 from an operator.

At step 1003, the translation arm is moved from the home position of FIG. 12 to the reverse extension position of FIG. 13. At step 1004, the turntable 300 is rotated thirty degrees in the direction (F) to the on-axis position to align the rear of the turntable 300 with the exchange port 310 and engage or seat the pin 303 in the cartridge notch 111, as shown in FIG. 20. At step 1005, the translation arm 302 is retracted to the home position of FIG. 12, to pull the tape cartridge 106 into the cavity 316 and onto the central axis of the turntable 300. The operation ends at step 1006.

Figure 11:
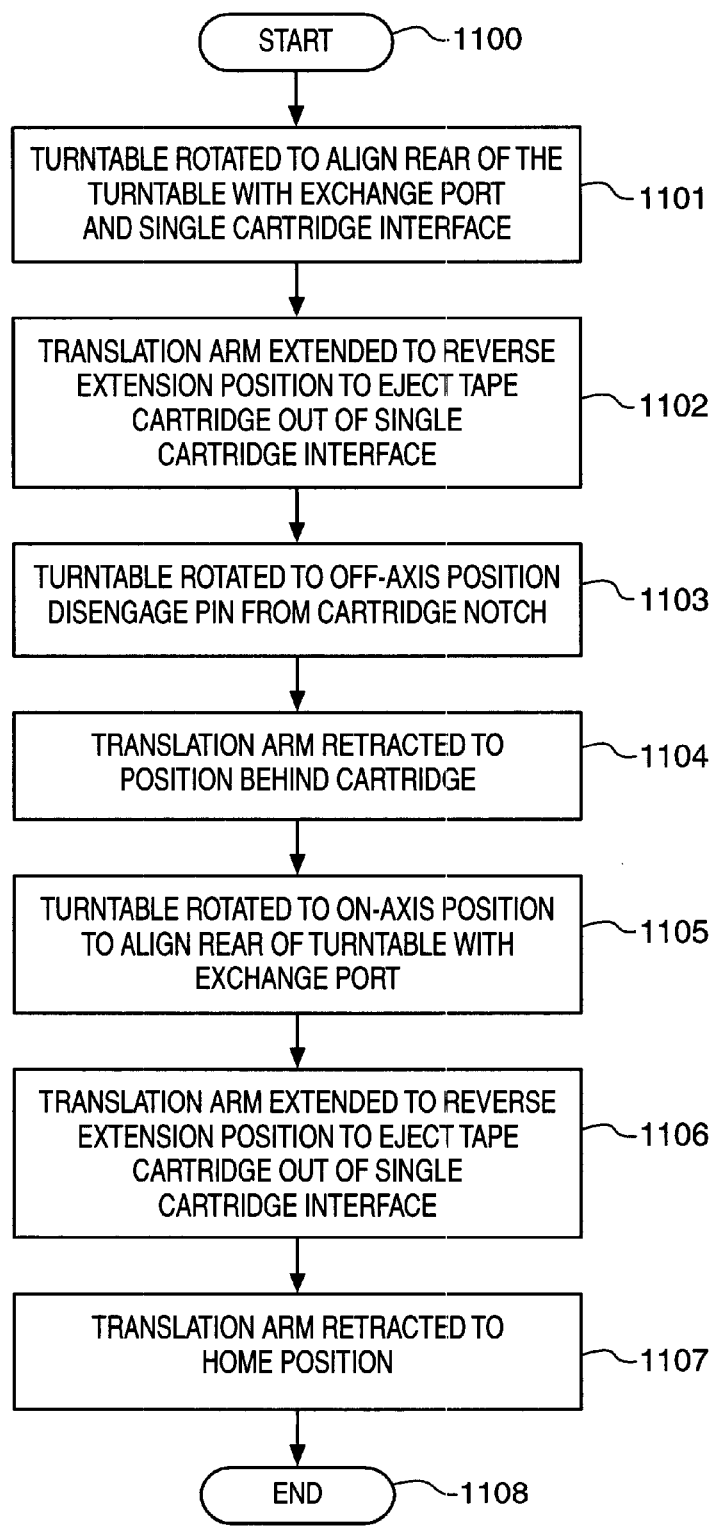
FIG. 11 is a flow chart illustrating another example of the operation of the tape cartridge picker.
Figure 21:
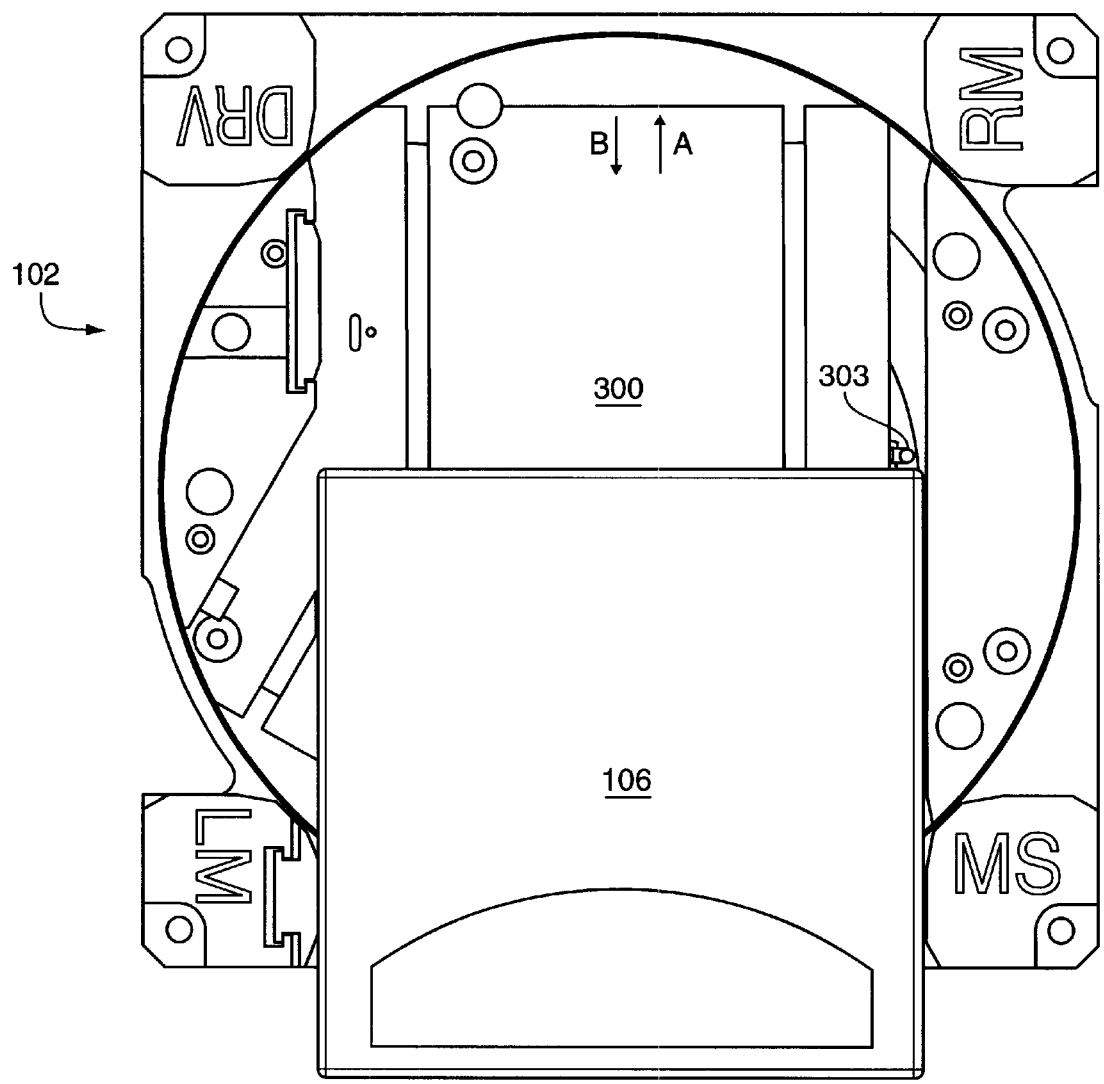
FIG. 21 is another plan view illustrating the operation of the tape cartridge picker.
Figure 22:
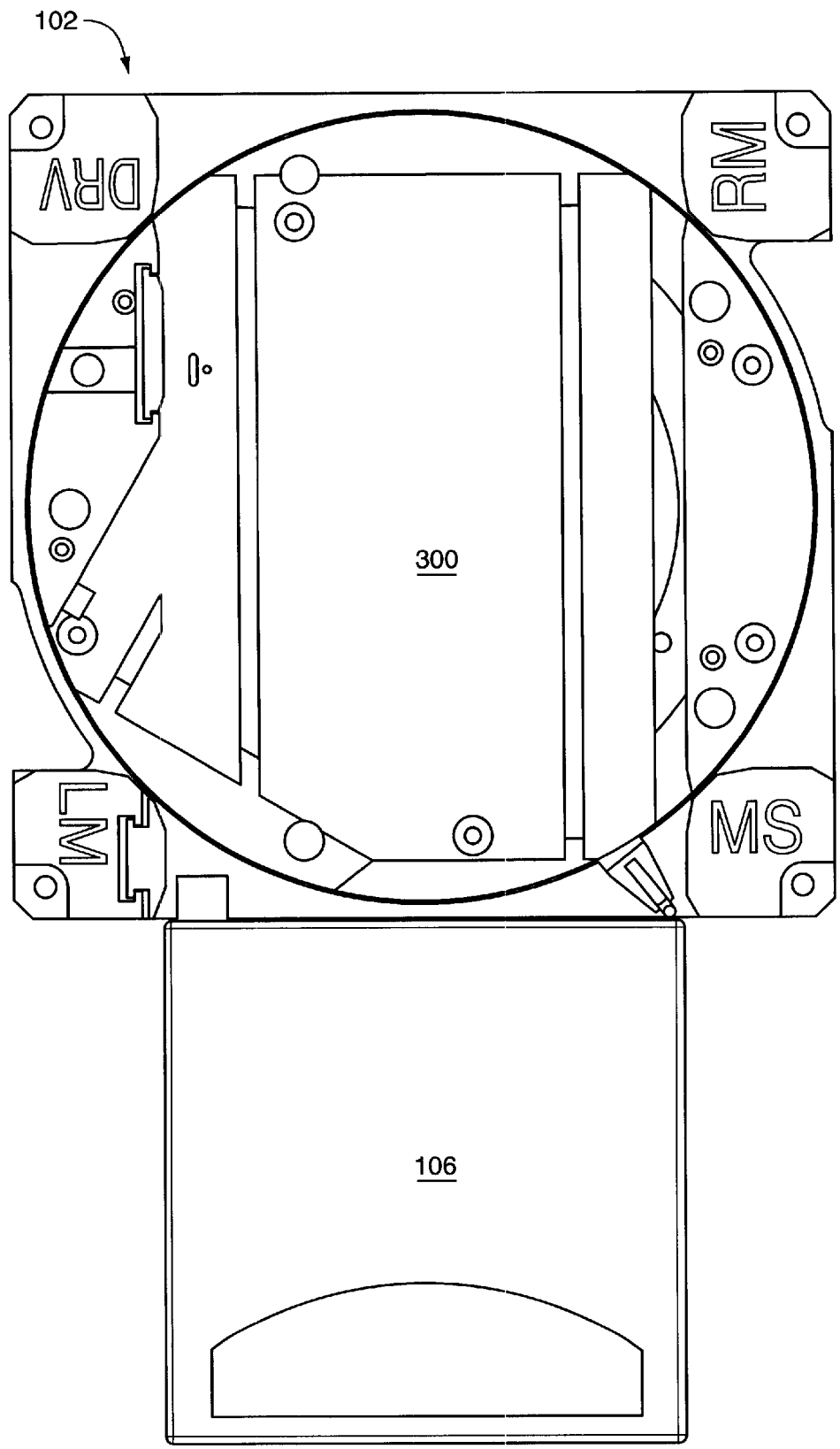
FIG. 22 is another plan view illustrating the operation of the tape cartridge picker.

FIG. 11 is a flow chart illustrating the delivery of the tape cartridge 106 to the single cartridge interface 107. On FIG. 11, the operation begins at step 1100 with the tape cartridge 106 loaded onto the cartridge picker 102 as described in reference to either FIG. 7 or FIG. 10. At step 1101, the turntable 300 is rotated to align the rear of the turntable 300 on-axis with the exchange port 310 and the single cartridge interface 107. At step 1102, the translation arm 302 is extended to the reverse extension position to eject the tape cartridge 106 out of the single cartridge interface 107 as shown in FIG. 20. At step 1103, the turntable 300 is again rotated in the direction (E) to the thirty-degree off-axis position to disengage the pin 303 from the cartridge notch 111, as shown in FIG. 13. At step 1104, the translation arm 302 is retracted to a position behind the cartridge 106 as shown in FIG. 18. At step 1105, the turntable 300 is rotated in the direction (F) to the on-axis position so that the rear of the turntable is aligned with the exchange port 310 and the translation arm 302 is behind the tape cartridge 106, as shown in FIG. 21. At step 1106, the translation arm 302 is again extended to a reverse extension position to eject the tape cartridge 106 the rest of the way out of the single cartridge interface 107, as shown in FIG. 22. It should be noted that the tape cartridge 106 only needs to be ejected far enough to permit free rotation of the picker 102 for subsequent operation. Advantageously, only ejecting the cartridge 106 far enough for subsequent operation prevents the cartridge 106 from being ejected out of the single cartridge interface 107 and onto the floor. At step 1107 the translation arm is retracted to home position of FIG. 12 and the operation ends at step 1108.

Figure 23:
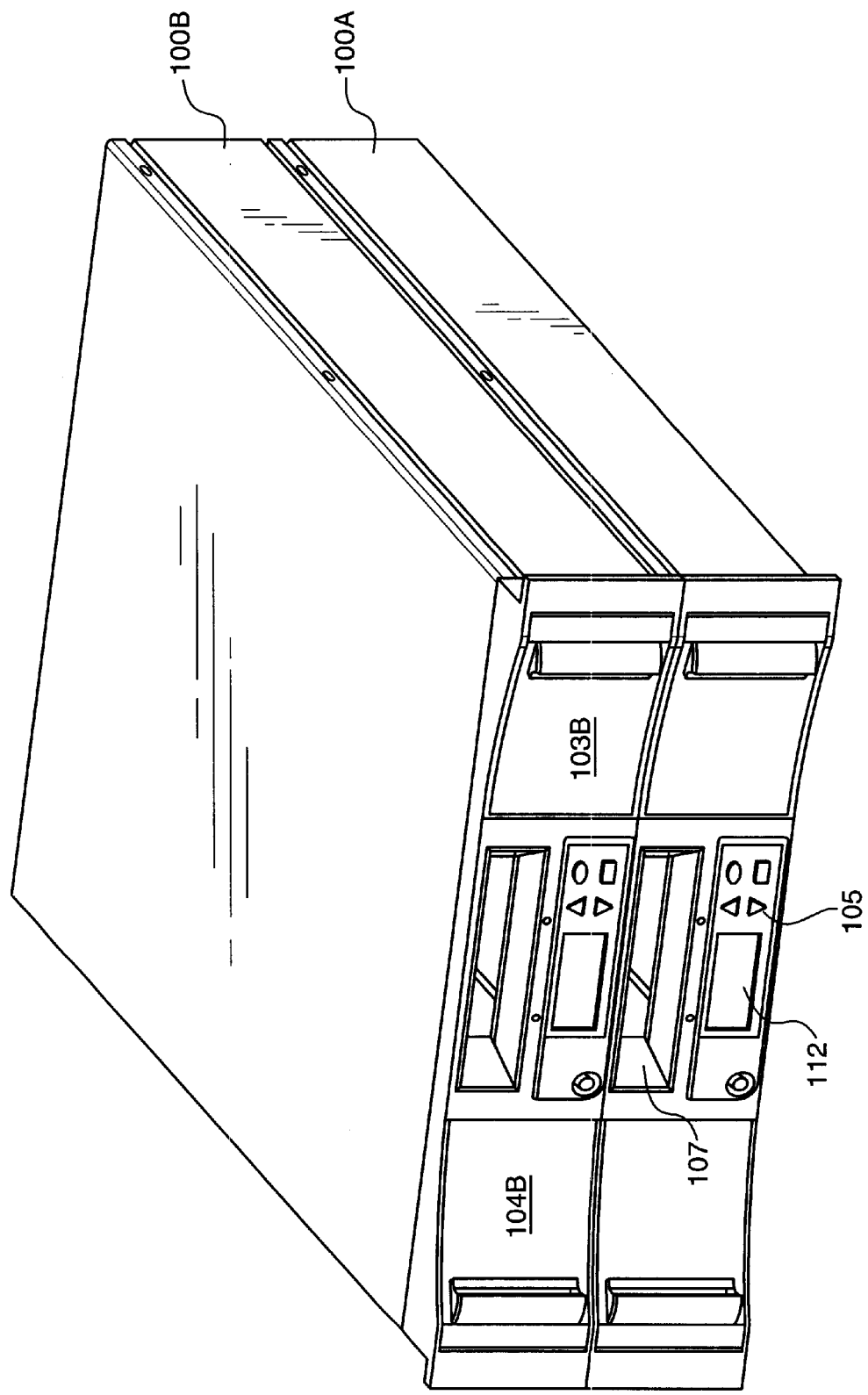
FIG. 23 illustrates a stacked configuration of the autoloader/library system.

Expansion of Tape Autoloader/Library Systems—FIG. 23

FIG. 23 illustrates multiple autoloader library systems in a stacked configuration. Those skilled in the art will appreciate that an infinite number of autoloader library systems could be stacked although only library systems 100(*a*) and 100(*b*) are shown on FIG. 23 for clarity.

The autoloader/library system 100 is configured to mechanically and electrically interconnect with other substantially identical autoloader/library systems by stacking multiple autoloader/library systems to provide expandability and scalability as a matter of design choice. Once coupled, the multiple autoloader/library systems 100(*a*) and 100(*b*) can share individual tape cartridges, e.g. 106, to provide efficient load balancing and performance between the coupled autoloader/library systems. The coupled autoloader/library systems 100(*a*) and 100(*b*) could each include a cartridge picker 102, tape cartridge transport magazines, 103 and 104, a tape drive 101, and a single cartridge interface 107, or could share elements such as the cartridge picker 102, the single cartridge interface and/or the tape drive 101. Alternatively, a single cartridge picker 102 configured with an elevator mechanism could serve both autoloader/library systems 100(*a*) and 100(*b*). In addition, the coupled autoloader/library systems 100(*a*) and 100(*b*) could each include an individual control panel 105 and interface 112 or could share a single control panel, e.g. 105, and interface, e.g. 112. In the case where the library systems, e.g. 100, are coupled, the cartridge picker 102 is configured to not only rotate but is also configured to elevate within the multiple library systems, 100(*a*) and 100(*b*), to access magazines, 103(*a*) and 104(*b*).

In another example, the library systems, 100(*a*) and 100(*b*), could share the single cartridge interface 107. In this case the single cartridge interface 107 is configured with an elevator mechanism to transport the single cartridge interface 107 in the vertical direction between the multiple library systems, 100(*a*) and 100(*b*). Operationally, the cartridge picker 102 in the system 100(*a*) could pass tape cartridges to the single cartridge interface 107. The single cartridge interface 107 then elevates to the system 100(*b*) where the tape cartridge is automatically passed to a cartridge picker, e.g. 100, in the system 100(*b*). The cartridge picker in the system 100(*b*) could then exchange the tape cartridge with the tape drive, e.g. 101 or the magazines, 103(*a*) and 103(*b*), in the system 100(*b*). Cartridges could also be passed from the system 100(*b*) to the system 100(*a*) in a similar manner. Thus, the autoloader/library system 100 is customizable to a variety of applications with the capability of expansion at any time to provide both increased capacity and/or increased performance.

The above-described processing systems could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are integrated circuits and logic circuitry. Those skilled in the art are familiar with instructions, processors, and storage media.

Those skilled in the art can appreciate variations of the above-described embodiments that fall within the scope of the invention. As a result, the invention is not limited to the specific embodiments discussed above, but only by the following claims and their equivalents.

What is claimed is:

1. A tape cartridge stop/compression pad for a tape cartridge picker, the cartridge stop/compression pad comprising:
   means for expanding when contacted by a tape cartridge to permit the tape cartridge to be fully received from a first location into a cavity of the cartridge picker; and
   means for stopping insertion of the tape cartridge from a second location, when contacted by the tape cartridge during the insertion, to prevent the tape cartridge from being fully received in the cavity of the cartridge picker.

2. The cartridge stop/compression pad of claim 1 wherein responsive to an action by the cartridge picker, the means for expanding is configured to expand and permit the tape cartridge to be fully received in the cartridge picker from the second location.

3. The cartridge stop/compression pad of claim 2 wherein the action by the cartridge picker comprises,
   a rotation.

4. The cartridge stop/compression pad of claim 2 wherein the first location is one of a tape drive and a tape cartridge storage location.

5. The cartridge stop/compression pad of claim 2 wherein the second location is a single tape cartridge interface.

6. A tape cartridge stop/compression pad for a tape cartridge picker, the cartridge stop/compression pad comprising:
   an elastic flange; and
   a boss integrally formed in the elastic flange, the boss comprising:
     a first geometry configured to expand the elastic flange when the first geometry is contacted by a tape cartridge to permit the tape cartridge to be fully received in a cavity of the cartridge picker from a first location; and
     a second geometry configured to stop the tape cartridge when the second geometry is contacted by the tape cartridge to prevent the tape cartridge from being fully received in the cavity of the cartridge picker from a second location.

7. The cartridge stop/compression pad of claim 6 wherein responsive to an action by the cartridge picker, the first geometry is configured to expand the elastic flange and permit the tape cartridge to b e fully received in the cartridge picker from the second location.

8. The cartridge stop/compression pad of claim 7 wherein the action by the cartridge picker comprises:
   rotating to present the first geometry to the stopped tape cartridge.

9. The cartridge/compression pad of claim 6 wherein the first location is one of a tape drive and a tape cartridge storage location.

10. The cartridge/compression pad of claim 6 wherein the second location is a single tape cartridge interface.

11. The cartridge/compression pad of claim 6 wherein the first geometry is a beveled portion.

12. The cartridge/compression pad of claim 6 wherein the second geometry is a planar portion.

13. A method for operating a tape cartridge stop/compression pad for a tape cartridge picker, the method comprising:

receiving a tape cartridge in a cavity of a tape cartridge picker from a first location;

responsive to receiving the tape cartridge from the first location, expanding to permit the tape cartridge to be fully received in the cavity of the tape cartridge picker from the first location;

receiving the tape cartridge in the cavity of the tape cartridge picker from a second location; and responsive to receiving the tape cartridge from the second location, pausing the receipt of the tape cartridge to prevent the tape cartridge from being fully received in the cavity of the cartridge picker from the second location.

14. The method of claim 13 the method further comprising:

responsive to an action by the cartridge picker; expanding to permit the tape cartridge to be fully received in the cavity of the cartridge picker from the second location.

15. The method of claim 13 wherein the first location is one of a tape drive and a tape cartridge storage location.

16. The cartridge/compression pad of claim 13 wherein the second location is a single tape cartridge interface.

17. A tape cartridge picker comprising:

a turntable, wherein the turntable is rotatable to interface with at least a first location and a second location;

a cavity defined in the turntable to receive a tape cartridge;

means for loading the tape cartridge into the cavity from at least the first and second locations; and a cartridge stop/compression pad comprising:
an elastic flange; and
a boss integrally formed in the elastic flange and including a first geometry to expand the elastic flange when the first geometry is contacted by the tape cartridge to permit full receipt of the tape cartridge in the cavity from the first location and a second geometry to stop the tape cartridge when the second geometry is contacted by the tape cartridge to prevent full receipt of the tape cartridge in the cavity from the second location.

18. The picker of claim 17 wherein responsive to an action by the cartridge picker, the first geometry expands the elastic flange to permit full receipt of the tape cartridge in the cavity from the second location.

19. The picker of claim 18 wherein the action by the cartridge picker comprises:

rotating to present the first geometry to the stopped tape cartridge.

20. The picker of claim 17 wherein the first location is one of a tape drive and a tape cartridge interface.

21. The picker of claim 17 wherein the second location is a single tape cartridge interface.

22. The picker of claim 17 wherein the first geometry is a beveled portion.

23. The picker of claim 17 wherein the second geometry is a planar portion.

* * * * *